US008878910B2

(12) United States Patent
Hoshino

(10) Patent No.: US 8,878,910 B2
(45) Date of Patent: Nov. 4, 2014

(54) STEREOSCOPIC IMAGE PARTIAL AREA ENLARGEMENT AND COMPOUND-EYE IMAGING APPARATUS AND RECORDING MEDIUM

(75) Inventor: Kenji Hoshino, Saitama (JP)

(73) Assignee: FUJIFILM Corporation, Tokyo (JP)

(*) Notice: Subject to any disclaimer, the term of this patent is extended or adjusted under 35 U.S.C. 154(b) by 554 days.

(21) Appl. No.: 12/953,516

(22) Filed: Nov. 24, 2010

(65) Prior Publication Data
US 2011/0122232 A1 May 26, 2011

(30) Foreign Application Priority Data

Nov. 26, 2009 (JP) ................................. 2009-268700

(51) Int. Cl.
*H04N 13/02* (2006.01)
*H04N 13/00* (2006.01)
(52) U.S. Cl.
CPC ................................ *H04N 13/0029* (2013.01)
USPC ........................................................ 348/47
(58) Field of Classification Search
CPC ................................................ H04N 13/0029
USPC .......................................................... 348/47
See application file for complete search history.

(56) References Cited

U.S. PATENT DOCUMENTS

2006/0192776 A1* 8/2006 Nomura et al. ................ 345/419
2008/0117290 A1* 5/2008 Mazza ............................. 348/47

FOREIGN PATENT DOCUMENTS

JP 2002-77947 A 3/2002
JP 2005-130312 A 5/2005

* cited by examiner

*Primary Examiner* — Richard Torrente
(74) *Attorney, Agent, or Firm* — Birch, Stewart, Kolasch & Birch, LLP

(57) ABSTRACT

A stereoscopic image display apparatus includes: a display device; an acquisition device for acquiring a left eye image and a right eye image; a first display control device for displaying a stereoscopic image on the display device based on the left and right eye image; an instruction reception device for receiving an instruction indicating enlargement and display of a partial area deviated in a horizontal direction from a center of the stereoscopic image; a cut-out device for cutting out areas necessary for the enlargement and display from the left and right eye image in response to the instruction; a deviation amount calculation unit for calculating a deviation amount in a vertical direction between a center of the left eye image and a center of the right eye image; an image movement device for moving the left eye image and/or the right eye image in the vertical direction by the calculated deviation amount; and a second display control device for enlarging and displaying the partial area on the display device based on the image after the movement.

10 Claims, 16 Drawing Sheets

FIG.11A

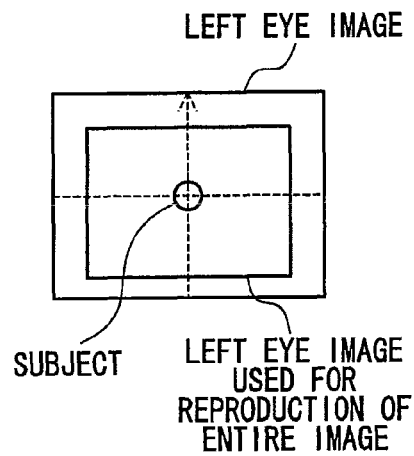

LEFT EYE IMAGE

SUBJECT   LEFT EYE IMAGE
          USED FOR
          REPRODUCTION OF
          ENTIRE IMAGE

FIG.11B

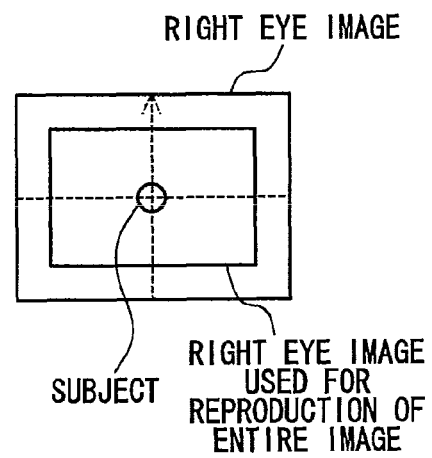

RIGHT EYE IMAGE

SUBJECT   RIGHT EYE IMAGE
          USED FOR
          REPRODUCTION OF
          ENTIRE IMAGE

FIG.12A

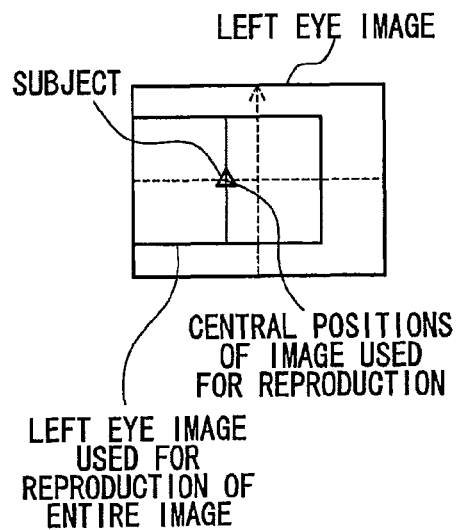

LEFT EYE IMAGE
SUBJECT

CENTRAL POSITIONS
OF IMAGE USED
FOR REPRODUCTION

LEFT EYE IMAGE
USED FOR
REPRODUCTION OF
ENTIRE IMAGE

FIG.12B

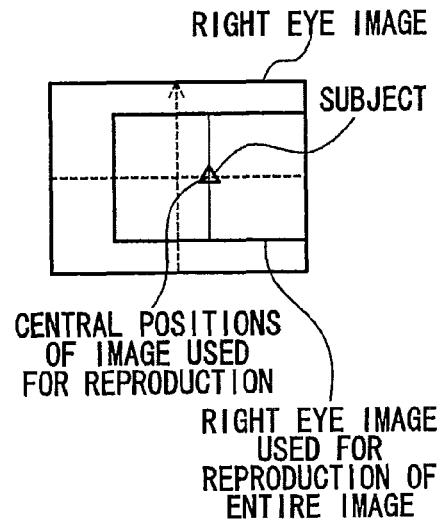

RIGHT EYE IMAGE
SUBJECT

CENTRAL POSITIONS
OF IMAGE USED
FOR REPRODUCTION

RIGHT EYE IMAGE
USED FOR
REPRODUCTION OF
ENTIRE IMAGE

STEREOSCOPIC IMAGE PARTIAL AREA ENLARGEMENT AND COMPOUND-EYE IMAGING APPARATUS AND RECORDING MEDIUM

BACKGROUND OF THE INVENTION

1. Field of the Invention

The presently disclosed subject matter relates to a stereoscopic image display apparatus, a compound-eye imaging apparatus, and a recording medium, and particularly, to a stereoscopic image display apparatus, a compound-eye imaging apparatus, and a recording medium capable of displaying a stereoscopic image.

2. Description of the Related Art

Japanese Patent Application Laid-Open No. 2005-130312 describes a stereoscopic vision image processing apparatus configured to detect feature points of photographed left and right images and to rotate and move the images to match the feature points.

Japanese Patent Application Laid-Open No. 2002-77947 describes a stereoscopic image correction apparatus configured to compare photographed left and right images to calculate a correction function formed by deviations in x and y directions of the images, rotational deviation, and magnification and to use the correction function to convert the image data.

SUMMARY OF THE INVENTION

In the stereoscopic display of an entire stereoscopic image, the stereoscopic vision is not affected much if the deviation of angle of left and right images is about 1° to 1.5°. In this case, there is a problem that the processing time is unnecessarily long if the deviation of images is always corrected as in the inventions described in Japanese Patent Application Laid-Open Nos. 2005-130312 and 2002-77947.

Meanwhile, when part of a stereoscopic image, particularly an edge section in a horizontal direction of the image, is extracted, enlarged, and displayed, there is a problem that the deviation in a perpendicular direction (up/down direction, vertical direction) of left and right images is large even if the deviation of angle of the left and right images is about 1° to 1.5°, which degrades the visibility of the stereoscopic image. The inventions described in Japanese Patent Application Laid-Open Nos. 2005-130312 and 2002-77947 cannot solve the problem.

The presently disclosed subject matter has been made in view of the circumstances, and an object of the presently disclosed subject matter is to provide a compound-eye imaging apparatus that can eliminate a parallax deviation in a vertical direction to improve the visibility of a stereoscopic image when part of the stereoscopic image, particularly an edge section in the horizontal direction of the image, is extracted, enlarged, and displayed.

To attain the object, a first aspect of the presently disclosed subject matter provides a stereoscopic image display apparatus including: a display device capable of displaying a stereoscopic image; an acquisition device configured to acquire a left eye image and a right eye image; a first display control device configured to display a stereoscopic image on the display device based on the left eye image and the right eye image; an instruction reception device configured to receive an instruction indicating enlargement and display of a partial area deviated in a horizontal direction from the center of the stereoscopic image displayed on the display device; a cut-out device configured to cut out areas necessary for the enlargement and display from the left eye image and the right eye image in response to the instruction received by the instruction reception device; a deviation amount calculation unit configured to calculate a deviation amount in a vertical direction between the center of the left eye image, from which the area necessary for the enlargement and display is cut out by the cut-out device, and the center of the right eye image, from which the area necessary for the enlargement and display is cut out by the cut-out device; an image movement device configured to move at least one of the left eye image and the right eye image, from which the areas necessary for the enlargement and display are cut out, in the vertical direction by the deviation amount calculated by the deviation amount calculation device; and a second display control device configured to enlarge and display the partial area, for which the instruction indicating the enlargement and display is received by the instruction reception device, on the display device based on the image after the movement by the image movement device.

According to the stereoscopic image display apparatus of the first aspect, the left eye image and the right eye image are acquired, and the stereoscopic image is displayed on the display device based on the left eye image and the right eye image. An instruction indicating enlargement and display of a partial area deviated in a horizontal direction from the center of the stereoscopic image displayed on the display device is received, and areas necessary for the enlargement and display from the left eye image and the right eye image are cut out in response to the received instruction. A deviation amount in a vertical direction between the center of the left eye image, from which the area necessary for the enlargement and display is cut out, and the center of the right eye image, from which the area necessary for the enlargement and display is cut out, is calculated, at least one of the left eye image and the right eye image, from which the areas necessary for the enlargement and display are cut out, is moved in a vertical direction in parallel by the calculated deviation amount, and the partial area, for which the instruction indicating the enlargement and display is received, is enlarged and displayed on the display device based on the image moved in parallel. As a result, the parallax deviation in the vertical direction that affects the stereoscopic vision can be eliminated when a partial area deviated from the center in the horizontal direction is enlarged and displayed, i.e. when the influence of the parallax deviation in the vertical direction generated by the rotational deviation between the right imaging system and the left imaging system is large. Since the image is moved in parallel in the vertical direction, the process can be alleviated as compared to when the image is rotated and moved, and the process can be finished in a short time. Therefore, a high parallax deviation correction effect can be obtained in a short processing time.

A second aspect of the presently disclosed subject matter provides the stereoscopic image display apparatus according to the first aspect, further including a corresponding point extraction device configured to extract corresponding points from the left eye image and the right eye image, from which the areas necessary for the enlargement and display are cut out, wherein the deviation amount calculation device calculates a distance between the corresponding points extracted by the corresponding point extraction device as the deviation amount.

According to the stereoscopic image display apparatus of the second aspect, corresponding points are extracted from the left eye image and the right eye image, from which the areas necessary for the enlargement and display are cut out, wherein a distance between the extracted corresponding points is calculated as the deviation amount. As a result, the deviation amount can be calculated from the images used for reproduction.

A third aspect of the presently disclosed subject matter provides the stereoscopic image display apparatus according to the first aspect, wherein the acquisition device acquires information indicating deviation of the left eye image and information indicating deviation of the right eye image along with the left eye image and the right eye image, and the deviation amount calculation device calculates the deviation amount in the vertical direction between the center of the left eye image, from which the area necessary for the enlargement and display is cut out by the cut-out device, and the center of the right eye image, from which the area necessary for the enlargement and display is cut out by the cut-out device, based on the acquired information indicating the deviation of the left eye image and the information indicating the deviation of the right eye image.

According to the stereoscopic image display apparatus of the third aspect, information indicating deviation of the left eye image and information indicating deviation of the right eye image are acquired along with the left eye image and the right eye image, and the deviation amount is calculated based on the acquired information. As a result, an enlarged image can be displayed in a short time because there is no need to execute image processing, such as detection of the corresponding point, every time an image is reproduced.

A fourth aspect of the presently disclosed subject matter provides the stereoscopic image display apparatus according to the third aspect, wherein the acquisition device acquires results of inspection, at a plurality of positions, of deviation amounts in the vertical direction between an actual imaging result of a predetermined subject and an ideal imaging result of the predetermined subject as the information indicating the deviation of the left eye image and the information indicating the deviation of the right eye image, and the deviation amount calculation device calculates the deviation amount based on the acquired results.

According to the stereoscopic image display apparatus of the fourth aspect, results of inspection, at a plurality of positions, of deviation amounts in the vertical direction between an actual imaging result of a predetermined subject and an ideal imaging result of the predetermined subject are acquired as the information indicating the deviation of the left eye image and the information indicating the deviation of the right eye image, and the deviation amount is calculated based on the acquired results. As a result, an accurate deviation amount can be calculated even if the right eye image and the left eye image are deformed due to distortion, etc.

A fifth aspect of the presently disclosed subject matter provides the stereoscopic image display apparatus according to the fourth aspect, wherein the deviation amount calculation device calculates the deviation amount in the vertical direction between the center of the left eye image, from which the area necessary for the enlargement and display is cut out by the cut-out device, and the center of the right eye image, from which the area necessary for the enlargement and display is cut out by the cut-out device, based on the deviation amount in the vertical direction at a position closest to the center of the partial area, for which the instruction indicating the enlargement and display is received by the instruction reception device, among the results of the inspection at the plurality of positions of the deviation amount in the vertical direction between the actual imaging result of the predetermined subject and the ideal imaging result of the predetermined subject.

According to the stereoscopic image display apparatus of the fifth aspect, the deviation amount in the vertical direction between the center of the left eye image, from which the area necessary for the enlargement and display is cut out, and the center of the right eye image, from which the area necessary for the enlargement and display is cut out, is calculated based on the deviation amount in the vertical direction at a position closest to the center of the partial area to be enlarged and displayed among the results of the inspection at the plurality of positions of the deviation amount in the vertical direction between the actual imaging result of the predetermined subject and the ideal imaging result of the predetermined subject.

A sixth aspect of the presently disclosed subject matter provides the stereoscopic image display apparatus according to the third aspect, wherein the acquisition device acquires a rotational deviation amount between the actual imaging result of the predetermined subject and the ideal imaging result of the predetermined subject as the information indicating the deviation of the left eye image and the information indicating the deviation of the right eye image, and the deviation amount calculation device calculates the deviation amount in the vertical direction between the center of the left eye image, from which the area necessary for the enlargement and display is cut out by the cut-out device, and the center of the right eye image, from which the area necessary for the enlargement and display is cut out by the cut-out device, based on the acquired rotational deviation amount and the position in the horizontal direction of the partial area, for which the instruction indicating the enlargement and display is received by the instruction reception device.

According to the stereoscopic image display apparatus of the sixth aspect, a rotational deviation amount between the actual imaging result of the predetermined subject and the ideal imaging result of the predetermined subject is acquired as the information indicating the deviation of the left eye image and the information indicating the deviation of the right eye image, and the deviation amount in the vertical direction between the center of the left eye image, from which the area necessary for the enlargement and display is cut out, and the center of the right eye image, from which the area necessary for the enlargement and display is cut out, is calculated based on the acquired rotational deviation amount and the position in the horizontal direction of the partial area, for which the instruction indicating the enlargement and display is received. As a result, there is no need to measure the deviation amount in the vertical direction at a plurality of positions in the inspection, and only the angle of the rotational deviation may be obtained. Therefore, effort in the inspection can be saved, and the time required for the inspection can be reduced.

A seventh aspect of the presently disclosed subject matter provides the stereoscopic image display apparatus according to any one of the first to sixth aspects, wherein the image movement device moves the left eye image and the right eye image, from which the areas necessary for the enlargement and display are cut out, by n pixels each if the deviation amount calculated by the deviation amount calculation device is 2n (n is an integer) pixels, and the image movement device moves one of the left eye image and the right eye image, from which the areas necessary for the enlargement and display are cut out, by n+1 pixels and the other by n pixels if the deviation amount calculated by the deviation amount calculation device is 2n+1 pixels.

According to the stereoscopic image display apparatus of the seventh aspect, the left eye image and the right eye image, from which the areas necessary for the enlargement and display are cut out, are moved by n pixels each if the deviation amount calculated by the deviation amount calculation device is 2n (n is an integer) pixels, and one of the left eye image and the right eye image, from which the areas necessary for the enlargement and display are cut out, is moved by n+1 pixels and the other is moved by n pixels if the deviation amount calculated by the deviation amount calculation device is 2n+1 pixels. As a result, an unnecessarily large reproduction margin is not required, and the stereoscopic image can be taken more in the wide-angle side.

An eighth aspect of the presently disclosed subject matter provides the stereoscopic image display apparatus according to any one of the first to seventh aspects, further including a storage device configured to store the image after the movement by the image movement device, wherein the second display control device uses the image stored in the storage device to enlarge and display the partial area, for which the instruction indicating the enlargement and display is received by the instruction reception device, on the display device.

According to the stereoscopic image display apparatus of the eighth aspect, the image after the movement by the image movement device is stored, and the stored image is used to enlarge and display the partial area, for which the instruction indicating the enlargement and display is received. As a result, the deviation amount, etc. does not have to be calculated when the image is displayed. Therefore, an easily viewable image without parallax deviation can be quickly displayed.

A ninth aspect of the presently disclosed subject matter provides a compound-eye imaging apparatus including: the stereoscopic image display apparatus according to any one of the first to eighth aspect; and a plurality of imaging devices configured to take the right eye image and the left eye image.

A tenth aspect of the presently disclosed subject matter provides a computer-readable recording medium including a stereoscopic image display program stored thereon, such that when the stereoscopic image display program is read and executed by a processor, the processor is configured to perform the steps of: a step of acquiring a left eye image and a right eye image; a step of displaying a stereoscopic image on a display device capable of displaying the stereoscopic image based on the left eye image and the right eye image; a step of receiving an instruction indicating enlargement and display of a partial area deviated in a horizontal direction from the center of the stereoscopic image displayed on the display device; a step of cutting out areas necessary for the enlargement and display from the left eye image and the right eye image in response to the received instruction; a step of calculating a deviation amount in a vertical direction between the center of the left eye image, from which the area necessary for the enlargement and display is cut out, and the center of the right eye image, from which the area necessary for the enlargement and display is cut out; a step of moving at least one of the left eye image and the right eye image, from which the areas necessary for the enlargement and display are cut out, in parallel in the vertical direction by the calculated deviation amount; and a step of enlarging and displaying the partial area, for which the instruction indicating the enlargement and display is received, on the display device based on the image after the movement.

According to the presently disclosed subject matter, the parallax deviation in the vertical direction can be eliminated, and the visibility of a stereoscopic image can be improved when part of the stereoscopic image, particularly an edge section in the horizontal direction of the image, is extracted, enlarged, and displayed.

BRIEF DESCRIPTION OF THE DRAWINGS

FIGS. 11A and 11B illustrate an example of images taken when there is a subject at a position of i of FIG. 10, FIG. 11A illustrating a left eye image, FIG. 11B illustrating a right eye image;

FIGS. 12A and 12B illustrate an example of images taken when there is a subject at a position of ii of FIG. 10, FIG. 12A illustrating a left eye image, FIG. 12B illustrating a right eye image;

DETAILED DESCRIPTION OF THE PREFERRED EMBODIMENTS

Hereinafter, the preferred embodiments for carrying out a compound-eye imaging apparatus according to the presently disclosed subject matter will be described in detail with reference to the attached drawings.

<First Embodiment>

Figure 1A:
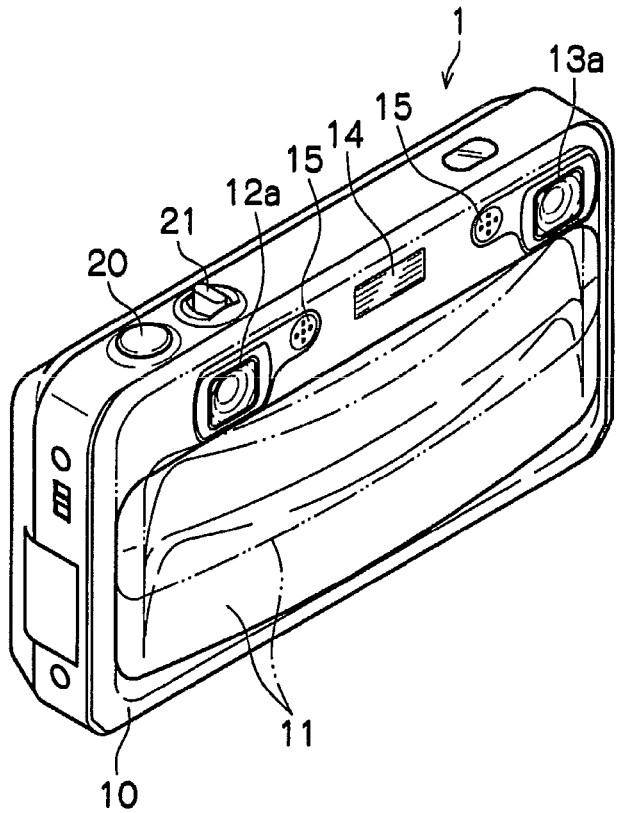
FIGS. 1A and 1B are schematic diagrams of a compound-eye digital camera of a first embodiment of the presently disclosed subject matter, FIG. 1A being a front view, FIG. 1B being a back view.
Figure 1B:
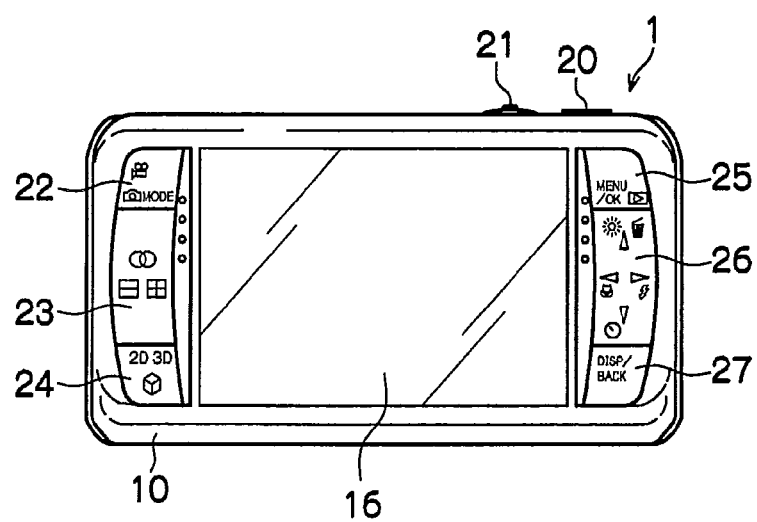

FIGS. 1A and 1B are schematic diagrams of a compound-eye digital camera 1 as a compound-eye imaging apparatus according to the presently disclosed subject matter. FIG. 1A is a front view, and FIG. 1B is a back view. The compound-eye digital camera 1 includes a plurality of (two are illustrated in FIGS. 1A and 1B) imaging systems, and the compound-eye digital camera 1 is capable of taking a stereoscopic image based on a plurality of viewpoints (left and right two viewpoints are illustrated in FIGS. 1A and 1B) of the same subject as well as a single-viewpoint image (two-dimensional image). The compound-eye digital camera 1 can record and reproduce not only still images but also moving images and sound.

A camera body 10 of the compound-eye digital camera 1 is formed in a substantially rectangular-solid-box shape. As illustrated in FIG. 1A, a barrier 11, a right imaging system 12, a left imaging system 13, a flash 14, and a microphone 15 are mainly arranged on the front side of the camera body 10. A release switch 20 and a zoom button 21 are mainly arranged on the upper surface of the camera body 10.

Meanwhile, as illustrated in FIG. 1B, a monitor 16, a mode button 22, a parallax adjustment button 23, a 2D/3D switch button 24, a MENU/OK button 25, arrow buttons 26, and a DISP/BACK button 27 are arranged on the back side of the camera body 10.

The barrier 11 is slidably mounted on the front side of the camera body 10, and vertical sliding of the barrier 11 switches an open state and a closed state. The barrier 11 is usually positioned at the upper end, i.e. in the closed state, as illustrated by a dotted line in FIG. 1A, and the barrier 11 covers objective lenses 12a, 13a, etc. This prevents damage of the lenses, etc. The lenses, etc. arranged on the front side of the camera body 10 are exposed when the barrier is positioned at the lower end, i.e. the open state (see a solid line of FIG. 1A), and the barrier 11 is slid. When a sensor not illustrated recognizes that the barrier 11 is in the open state, a CPU (central processing unit) 110 (see FIG. 2) turns on the power, and imaging is possible.

Figure 2:
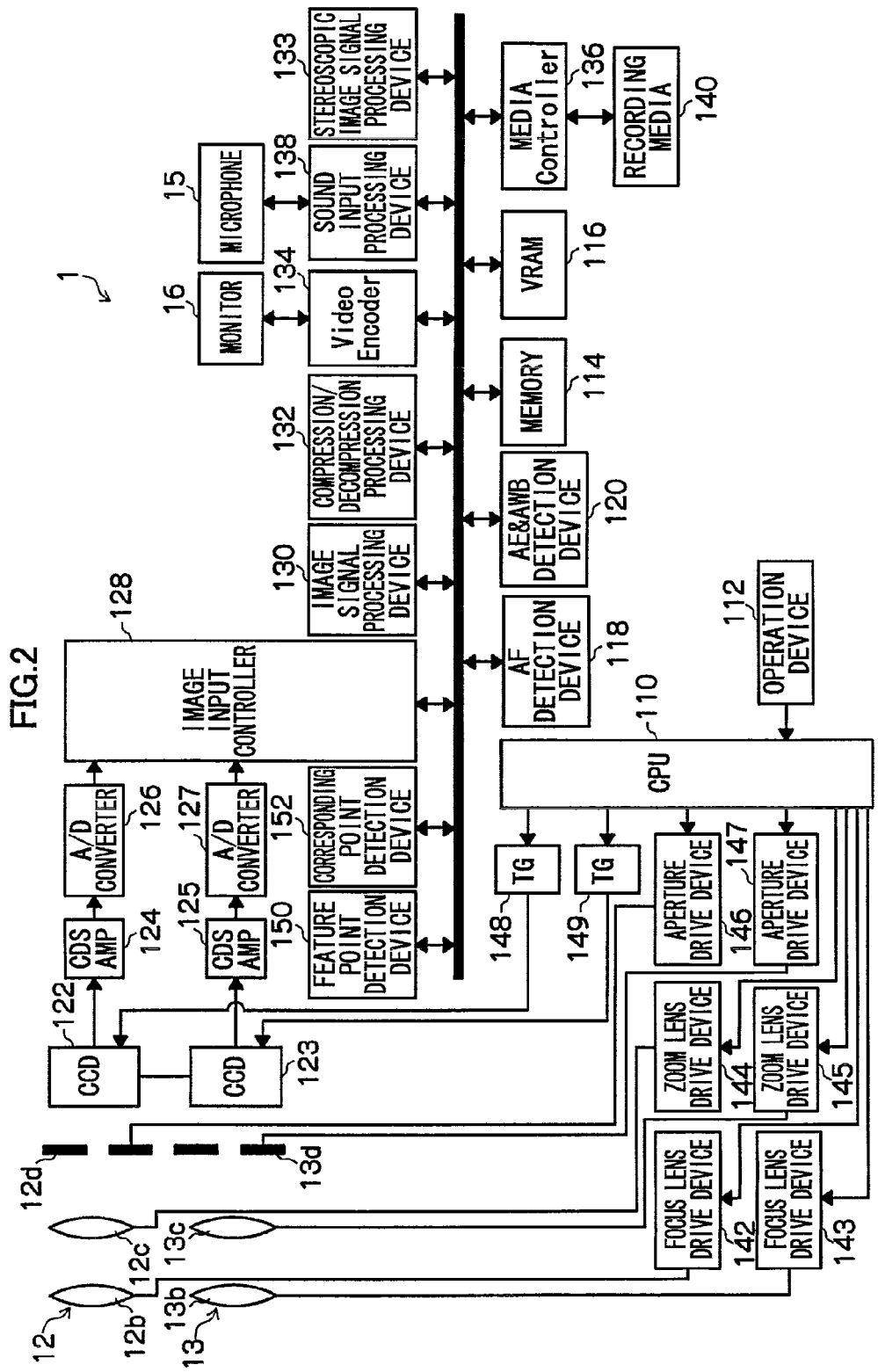
FIG. 2 is a block diagram illustrating an electrical configuration of the compound-eye digital camera.

The right imaging system 12 that takes an image for right eye and the left imaging system 13 that takes an image for left eye are optical units including imaging lens groups with bending optical systems, aperture/mechanical shutters 12d and 13d, and imaging elements 122 and 123 (see FIG. 2). The imaging lens groups of the right imaging system 12 and the left imaging system 13 are mainly constituted by the objective lenses 12a and 13a that import light from a subject, prisms (not illustrated) that bend a path of the light entered from the objective lenses substantially perpendicularly, zoom lenses 12c and 13c (see FIG. 2), and focus lenses 12b and 13b (see FIG. 2).

The flash 14 is constituted by a xenon tube or an LED (light-emitting diode), and the flash 14 emits light as necessary when a dark subject is imaged, during backlight, etc.

The monitor 16 is a liquid crystal monitor that has a typical aspect ratio of 4:3 and that is capable of color display. The monitor 16 can display stereoscopic images and plane images. Although a detailed configuration of the monitor 16 is not illustrated, the monitor 16 is a parallax-barrier 3D monitor including a parallax barrier display layer on the surface. The monitor 16 is used as a user interface display panel for various setting operations and is used as an electronic viewfinder during imaging.

The monitor 16 can switch a mode for displaying a stereoscopic image (3D mode) and a mode for displaying a plane image (2D mode). In the 3D mode, a parallax barrier including a pattern, in which light transmission sections and light shielding sections are alternately arranged at a predetermined pitch, is generated on the parallax barrier display layer of the monitor 16, and strip-shaped image pieces indicating left and right images are alternately arranged and displayed on an image display surface which is a layer below the parallax barrier display layer. Nothing is displayed on the parallax barrier display layer when the monitor 16 is in the 2D mode or used as the user interface display panel, and one image is displayed on the image display surface below the parallax barrier display layer.

The monitor 16 is not limited to the parallax barrier system, and a lenticular system, an integral photography system using a microlens array sheet, a holography system using an interference phenomenon, etc. may also be implemented. The monitor 16 is not limited to the liquid crystal monitor, and an organic EL (electroluminescence), etc. may also be implemented.

The release switch 20 is constituted by a two-stroke switch including so-called "half-press" and "full-press". When the release switch 20 is half-pressed during still image photographing (for example, when a still image photographing mode is selected by the mode button 22, or when the still image photographing mode is selected from the menu), the compound-eye digital camera 1 executes imaging preparation processes, i.e. AE (Automatic Exposure), AF (Auto Focus), and AWB (Automatic White Balance). When the release switch 20 is full-pressed, the compound-eye digital camera 1 executes an imaging/recording process of an image. The compound-eye digital camera 1 starts taking moving images when the release switch 20 is full-pressed during moving image photographing (for example, when a moving image photographing mode is selected by the mode button 22, or when the moving image photographing mode is selected from the menu) and ends imaging when the release switch 20 is full-pressed again.

The zoom button 21 is used for zoom operations of the right imaging system 12 and the left imaging system 13 and is constituted by a zoom tele button 21T for instructing zooming to the telephoto side and a zoom wide button 21W for instructing zooming to the wide-angle side.

The mode button 22 functions as an imaging mode setting device that sets an imaging mode of the digital camera 1, and the imaging mode of the digital camera 1 is set to various modes based on the setting location of the mode button 22. The imaging mode is classified into a "moving image photographing mode" for taking moving images and a "still image photographing mode" for taking still images. The "still image photographing mode" includes, for example, an "auto imaging mode" in which the digital camera 1 automatically sets an aperture, a shutter speed, etc., a "face extraction imaging mode" for extracting and imaging the face of a person, a "sport imaging mode" suitable for imaging moving bodies, a "landscape imaging mode" suitable for imaging landscapes, a "night view imaging mode" suitable for imaging evening views and night views, an "aperture-prioritized imaging mode" in which the user sets the scale of the aperture and the digital camera 1 automatically sets the shutter speed, a "shutter speed-prioritized imaging mode" in which the user sets the shutter speed and the digital camera 1 automatically sets the scale of the aperture, and a "manual imaging mode" in which the user sets the aperture, shutter speed, etc.

The parallax adjustment button 23 is a button for electronically adjusting the parallax during stereoscopic imaging. When the right side of the parallax adjustment button 23 is pressed, the parallax between an image taken by the right imaging system 12 and an image taken by the left imaging system 13 increases by a predetermined distance. When the left side of the parallax adjustment button 23 is pressed, the parallax between the image taken by the right imaging system 12 and the image taken by the left imaging system 13 decreases by a predetermined distance.

The 2D/3D switch button 24 is a switch for instructing switching of the 2D imaging mode for taking a single-viewpoint image and the 3D imaging mode for taking a multi-viewpoint image.

The MENU/OK button 25 is used for invocation (MENU function) of a screen for various settings (menu screen) of functions of imaging and reproduction and is used for confirmation of selection, instruction of execution of a process, etc. (OK function). All adjustment items included in the compound-eye digital camera 1 are set. When the MENU/OK button 25 is pressed during imaging, a setting screen for image quality adjustment, etc. of exposure value, hue, ISO (International Organization for Standardization) sensitivity, the number of recorded pixels, etc. is displayed on the monitor 16. When the MENU/OK button 25 is pressed during reproduction, a setting screen for deletion of an image, etc. is displayed on the monitor 16. The compound-eye digital camera 1 operates according to the conditions set on the menu screen.

The arrow buttons 26 are buttons for setting and selecting various menus, or for zooming. The arrow buttons 26 can be pressed and operated in vertical and horizontal four directions, and a function corresponding to the setting state of the camera is allocated to the button in each direction. For example, a function for switching ON/OFF of a macro function is allocated to the left button during imaging, and a function for switching a flash mode is allocated to the right button. A function for switching the brightness of the monitor 16 is allocated to the up button, and a function for switching ON/OFF or the time of a self-timer is allocated to the down button. A function for advancing the frame is allocated to the right button during reproduction, and a function for rewinding the frame is allocated to the left button. A function for deleting an image being reproduced is allocated to the up button. A function for moving the cursor displayed on the monitor 16 in the directions of the buttons is allocated during various settings.

The DISP/BACK button 27 functions as a button for instructing switching of display of the monitor 16. When the DISP/BACK button 27 is pressed during imaging, the display of the monitor 16 switches ON→framing guide display→OFF. When the DISP/BACK button 27 is pressed during reproduction, the display switches normal reproduction→reproduction without character display→multi-reproduction. The DISP/BACK button 27 also functions as a button for canceling the input operation and instructing restoration of the previous operation state.

FIG. 2 is a block diagram illustrating a main internal configuration of the compound-eye digital camera 1. The compound-eye digital camera 1 includes the CPU 110, an operation device (such as the release button 20, the MENU/OK button 25, and the arrow button 26) 112, a memory (SDRAM (synchronous dynamic random access memory)) 114, a VRAM (video random access memory) 116, an AF detection device 118, an AE/AWB detection device 120, imaging elements 122 and 123, CDS/AMPs (correlated double sampling/amplifier) 124 and 125, A/D (analog-to-digital) converters 126 and 127, an image input controller 128, an image signal processing device 130, a compression/decompression processing device 132, a stereoscopic image signal processing device 133, a video encoder 134, a media controller 136, a sound input processing device 138, recording media 140, focus lens drive devices 142 and 143, zoom lens drive devices 144 and 145, aperture drive devices 146 and 147, timing generators (TG) 148 and 149, a feature point detection device 150, and a corresponding point detection device 152.

The CPU 110 comprehensively controls the entire operation of the compound-eye digital camera 1. The CPU 110 controls the operations of the right imaging system 12 and the left imaging system 13. Although the right imaging system 12 and the left imaging system 13 basically operate in conjunction, individual operations are also possible. The CPU 110 sets two image data obtained by the right imaging system 12 and the left imaging system 13 as strip-shaped image pieces and generates display image data for alternately displaying the image pieces on the monitor 16. A parallax barrier including a pattern in which light transmission sections and light shielding sections are alternately arranged at a predetermined pitch on the parallax barrier display layer is generated in the display in the 3D mode, and the strip-shaped image pieces indicating the left and right images are alternately arranged and displayed on the image display surface, which is the layer below, to enable the stereoscopic vision.

The SDRAM 114 records firmware as control programs executed by the CPU 110, various data necessary for the control, camera setting values, data of photographed images, etc.

The VRAM 116 is used as a working area of the CPU 110 and as a temporary storage area of image data.

The AF detection device 118 calculates a physical quantity necessary for AF control from an inputted image signal in accordance with a command from the CPU 110. The AF detection device 118 is constituted by a right imaging system AF control circuit that performs AF control based on an image signal inputted from the right imaging system 12 and a left imaging system AF control circuit that performs AF control based on an image signal inputted from the left imaging system 13. In the digital camera 1 of the present embodiment, the AF control is performed based on the contrast of the images obtained from the imaging elements 122 and 123 (so-called contrast AF), and the AF detection device 118 calculates a focus evaluation value indicating the sharpness of the images from the inputted image signals. The CPU 110 detects a position where the focus evaluation value calculated by the AF detection device 118 is a local maximum and moves the focus lens group to the position. More specifically, the CPU 110 moves the focus lens group from the closest range to the infinity in predetermined steps, acquires the focus evaluation value at each position, sets the position with the maximum focus evaluation value as a focus position, and moves the focus lens group to the position.

The AE/AWB detection circuit 120 calculates a physical quantity necessary for AE control and AWB control from an inputted image signal in accordance with a command from the CPU 110. For example, the AE/AWB detection circuit 120 divides one screen into a plurality of areas (for example, 16×16) and calculates integrated values of R (red), G (green), and B (blue) image signals in each divided area to obtain the physical quantity necessary for the AE control. The CPU 110 detects the brightness of the subject (subject luminance) based on the integrated values obtained from the AE/AWB detection circuit 120 and calculates an exposure value suitable for imaging (imaging EV value). The CPU 110 then determines the aperture value and the shutter speed from the calculated imaging EV value and a predetermined program diagram. The CPU 110 divides one screen into a plurality of areas (for example, 16×16) and calculates an average integrated value of each color of R, G, and B image signals in each divided area to obtain the physical quantity necessary for the AWB control. The CPU 110 obtains ratios of R/G and B/G in each divided area from the obtained integrated values of R, integrated values of B, and integrated values of G and determines the light source type based on the obtained values of R/G and B/G, distributions in color spaces of R/G and B/G, etc. The CPU 110 then determines a gain value for the R, G, and B signals of the white balance adjustment circuit (white balance correction value) to set the values of the ratios to, for example, about 1 (i.e. integration ratio of RGB in one screen is R:G:B≈1:1:1) in accordance with a white balance adjustment value suitable for the determined light source type.

The imaging elements 122 and 123 are constituted by color CCDs (charge-coupled devices) including R, G, and B color filters in a predetermined color filter arrangement (for example, honeycomb arrangement or Bayer arrangement). The imaging elements 122 and 123 receive subject light formed by the focus lenses 12b and 13b, the zoom lenses 12C and 13C, etc. Photodiodes arranged on the light receiving surface convert the light entered into the light receiving surface to signal charge in an amount corresponding to the incident light amount. As for the optical storage/transfer operations of the imaging elements 122 and 123, the electronic shutter speeds (optical charge storage times) are determined based on charge discharge pulses inputted from the TGs 148 and 149, respectively.

More specifically, if the charge discharge pulses are inputted to the imaging elements 122 and 123, the charge is discharged without being stored in the imaging elements 122 and 123. On the other hand, if the charge discharge pulses are not inputted to the imaging elements 122 and 123 any more, the charge is not discharged. Therefore, charge storage, i.e. exposure, is started in the imaging elements 122 and 123. The imaging signals acquired by the imaging elements 122 and 123 are outputted to the CDS/AMPs 124 and 125 based on drive pulses provided from the TGs 148 and 149.

The CDS/AMPs 124 and 125 apply a correlated double sampling process (process of obtaining accurate pixel data by calculating a difference between a field through component level and a pixel signal component level included in an output signal of each pixel of the imaging elements to reduce noise (particularly, thermal noise), etc. included in the output signal of the imaging element) to image signals outputted from the imaging elements 122 and 123 to amplify the image signals to generate analog image signals of R, G, and B.

The A/D converters 126 and 127 convert the analog image signals of R, G, and B generated by the CDS/AMPs 124 and 125 to digital image signals.

The image input controller 128 including a line buffer of a predetermined capacity stores image signals of one image outputted from the CDS/AMP, and the A/D converters in accordance with a command from the CPU 110 and records the image signals in the VRAM 116.

The image signal processing device 130 includes a pixel interpolation circuit (processing circuit that interpolates spatial deviation of color signals associated with a color filter arrangement of a single-plate CCD to convert the color signals to a synchronization system), a white balance correction circuit, a gamma correction circuit, a contour correction circuit, a luminance/color difference signal generation circuit, etc. The image signal processing device 130 applies required signal processing to the inputted image signals in accordance with a command from the CPU 110 to generate image data (YUV data) including luminance data (Y data) and color difference data (Cr and Cb data).

The compression/decompression processing device 132 applies a compression process in a predetermined format to the inputted image data in accordance with a command from the CPU 110 to generate compressed image data. The compression/decompression processing device 132 applies a decompression process in a predetermined format to the inputted compressed image data in accordance with a command from the CPU 110 to generate uncompressed image data.

Based on information of the zoom position during imaging, etc., the stereoscopic image signal processing device 133 determines, for each of the right eye image and the left eye image, which area of the image for right eye (hereinafter, "right eye image") taken by the right imaging system 12 and of the image for left eye (hereinafter, "left eye image") taken by the left imaging system 13 will be used and reproduced and cuts out the right eye image and the left eye image used for reproduction from the right eye image and the left eye image. The right eye image and the left eye image used for reproduction are cut out based on corresponding point detection. For example, the stereoscopic image signal processing device 133 detects the same subject near the centers of the right eye image and the left eye image from the right eye image and the left eye image based on a feature point detected by the feature point extraction device 150 and a corresponding point detected by the corresponding point detection device 152. The stereoscopic image signal processing device 133 cuts out predetermined areas, which mainly include the same detected subject, from the right eye image and the left eye image to acquire the right eye image and the left eye image used for the reproduction.

The stereoscopic image signal processing device 133 processes the right eye image and the left eye image used for the reproduction to allow stereoscopic display by the monitor 16. For example, if the monitor 16 is a monitor of a parallax barrier system, the stereoscopic image signal processing device 133 separates the right eye image and the left eye image used for the reproduction into strip shapes and generates an image for display in which the strip-shaped right eye images and left eye images are alternately arranged. The stereoscopic image signal processing device 133 outputs the image for display to the monitor 16 trough the video encoder 134.

The video encoder 134 controls display to the monitor 16. More specifically, the video encoder 134 converts an image signal stored in the recording media 140, etc. to a video signal (for example, NTSC (National Television System Committee) signal, PAL (Phase Alternating Line) signal, and SECAM (Séquentiel couleur à mémoire) signal) for display on the monitor 16 to output the video signal to the monitor 16 and outputs predetermined characters and graphic information to the monitor 16 as necessary.

The media controller 136 records the image data compressed by the compression/decompression processing device 132 in the recording media 140.

An audio signal inputted to the microphone 15 and amplified by a stereo microphone amplifier not illustrated is inputted, and the sound input processing device 138 applies an encoding process to the audio signal.

The recording media 140 are various recording media such as semiconductor memory cards represented by xD-Picture Card (registered trademark) and Smart Media (registered trademark), portable small hard disks, magnetic disks, optical disks, and magneto-optical disks that can be attached and detached to and from the compound-eye digital camera 1.

The focus lens drive devices 142 and 143 move the focus lenses 12b and 13b in optical axis directions, respectively, to change the focus position in accordance with a command from the CPU 110.

The zoom lens drive devices 144 and 145 move the zoom lenses 12c and 13c in optical axis directions, respectively, to change the focus distance in accordance with a command from the CPU 110.

The aperture/mechanical shutters 12d and 13d are driven by iris motors of the aperture drive devices 146 and 147, respectively, to change the opening amounts and adjust the incident light amounts to the imaging element 123.

The aperture drive devices 146 and 147 change the opening amounts of the aperture/mechanical shutters 12d and 13d to adjust the incident light amounts to the imaging element 123, respectively, in accordance with a command from the CPU 110. The aperture drive devices 146 and 147 also open and close the aperture/mechanical shutters 12d and 13d to expose/shield the imaging elements 122 and 123, respectively, in accordance with a command from the CPU 110.

The feature point extraction device 150 extracts feature points from one of the right eye image and the left eye image (hereinafter, called "reference image"). The correspondence between points and points in the images need to be determined to move at least one of the right eye image and the left eye image in a process of eliminating the parallax deviation between the right eye image and the left eye image in the CPU 110 (described in detail later). Therefore, points that can be easily matched are selected, and the correspondence between the points of a plurality of image data is determined The points that can be easily matched are the feature points. Various already-known methods can be used as the method of extracting the feature points from the image data. The left eye image serves as the reference image in the present embodiment.

The corresponding point detection device 152 detects corresponding points of the image other than the reference image (hereinafter, called "sub-image") between the right eye image and the left eye image, the corresponding points corresponding to the feature points inputted from the feature point extraction device 150. The feature points extracted by the feature point extraction device 150 and the sub-image (the right eye image in the present embodiment) are inputted to the corresponding point detection device 152. The corresponding point detection device 152 first detects what kind of features the feature points of the inputted image have. The corresponding point detection device 152 extracts the corresponding points corresponding to the inputted feature points.

Operations of the compound-eye digital camera 1 configured this way will be described. The power of the compound-eye digital camera 1 is turned on when the barrier 11 is slid from the closed state to the open state, and the compound-eye digital camera 1 is activated under the imaging mode. The 2D mode and the 3D imaging mode for taking a stereoscopic image based on two viewpoints of the same subject can be set as the imaging mode. The 3D imaging mode for using the right imaging system 12 and the left imaging system 13 to simultaneously take a stereoscopic image with predetermined parallax can be set as the 3D mode. The imaging mode can be set from an imaging mode menu screen displayed on the monitor 16 by selecting "imaging mode" by the arrow buttons 26, etc. on the menu screen displayed on the monitor 16 by pressing the MENU/OK button 25 during the drive of the compound-eye digital camera 1 in the imaging mode.

(1) 2D Imaging Mode

The CPU 110 selects the right imaging system 12 or the left imaging system 13 (the left imaging system 13 in the present embodiment), and the imaging element 123 of the left imaging system 13 starts imaging for a photographing checking image. More specifically, the imaging elements 123 consecutively take images and consecutively processes the image signals to generate image data for the photographing checking image.

The CPU 110 sets the monitor 16 to the 2D mode, sequentially adds the generated image data to the video encoder 134 to convert the image data into a signal format for display, and outputs the signal to the monitor 16. As a result, the image captured by the imaging element 123 is displayed on the monitor 16. Although the video encoder 134 is not necessary if the input of the monitor 16 is compliant with digital signals, the image data needs to be converted to a signal format corresponding to the input specification of the monitor 16.

The user performs framing while watching the photographing checking image displayed on the monitor 16, checks the subject to be imaged, checks the image after photographing, or sets the imaging conditions.

An S1 ON signal is inputted to the CPU 110 when the release switch 20 is half-pressed during the imaging standby state. The CPU 110 detects the signal and performs AE photometry and AF control. The brightness of the subject is measured based on the integrated values of the image signals imported through the imaging element 123, etc. during the AE photometry. The measured value (photometric value) is used to determine the aperture value and the shutter speed of the aperture/mechanical shutter 13d during the main imaging. At the same time, whether the emission of the flash 14 is necessary is determined based on the detected subject luminance. The flash 14 is pre-emitted if it is determined that the emission of the flash 14 is necessary, and the amount of light emission of the flash 14 during the main imaging is determined based on the reflected light.

An S2 ON signal is inputted to the CPU 110 when the release switch is full-pressed. The CPU 110 executes imaging and recording processes in response to the S2 ON signal.

The CPU 110 drives the aperture/mechanical shutter 13d through the aperture drive device 147 based on the aperture value determined based on the photometric value and controls the charge storage time (so-called electronic shutter) in the imaging element 123 to attain the shutter speed determined based on the photometric value.

The CPU 110 sequentially moves the focus lens to lens positions corresponding to the closest range to the infinity during the AF control and acquires, from the AF detection device 118, an evaluation value obtained by integrating the high frequency components of the image signals based on the image signals in AF areas of the images imported through the imaging element 123 from each lens position. The CPU 110 obtains the lens position where the evaluation value is at the peak and performs contrast AF for moving the focus lens to the lens position.

In this case, if the flash 14 is to emit light, the flash 14 emits light based on the amount of light emission of the flash 14 obtained from the result of the pre-emission.

The subject light enters the light receiving surface of the imaging element 123 through the focus lens 13b, the zoom lens 13c, the aperture/mechanical shutter 13d, an infrared cut filter 46, an optical low-pass filter 48, etc.

The signal charges stored in the photodiodes of the imaging element 123 are read out in accordance with a timing signal applied from the TG 149, sequentially outputted from the imaging element 123 as voltage signals (image signals), and inputted to the CDS/AMP 125.

The CDS/AMP 125 applies a correlated double sampling process to a CCD output signal based on a CDS pulse and amplifies an image signal outputted from a CDS circuit based on an imaging sensitivity setting gain applied from the CPU 110.

The A/D converter 127 converts an analog image signal outputted from the CDS/AMP 125 to a digital image signal. The converted image signal (RAW data of R, G, and B) is transferred to the SDRAM 114, and the SDRAM 114 temporarily stores the image signal.

The R, G, and B image signals read out from the SDRAM 114 are inputted to the image signal processing device 130. In the image signal processing device 130, a white balance adjustment circuit applies a digital gain to each of the R, G, and B image signals to adjust the white balance, a gamma correction circuit executes a gradation conversion process according to the gamma characteristics, and a synchronization circuit interpolates spatial deviation of the color signals associated with the color filter arrangement of the single-plate CCD to execute a synchronization process of matching the phases of the color signals. A luminance/color difference data generation circuit further converts the synchronized R, G, and B image signals into a luminance signal Y and color difference signals Cr and Cb (YC signals), and predetermined signal processing, such as edge enhancement, is executed. The YC signals processed by the image signal processing device 130 are stored in the SDRAM 114 again.

The compression/decompression processing device 132 compresses the YC signals stored in the SDRAM 114, and the YC signals are recorded in the recording media 140 as an image file in a predetermined format through the media controller 136. Data of still images are stored in the recording media 140 as an image file compliant with an Exif (Exchangeable image file format) standard. An Exif file includes an area for storing data of main images and an area for storing data of reduced images (thumbnail images). Thumbnail images in a predetermined size (for example, 160×120 or 80×60 pixels) are generated through a thinning process of pixels and other necessary data processing for the data of the main images acquired by imaging. The thumbnail images generated this way are written in the Exif file along with the main images. Tag information, such as imaging date/time, imaging conditions, and face detection information, is attached to the Exif file.

When the mode of the compound-eye digital camera 1 is set to the reproduction mode, the CPU 110 outputs a command to the media controller 136 to cause the recording media 140 to read out the lastly recorded image file.

The compressed image data of the read out image file is added to the compression/decompression processing device 132, decompressed to uncompressed luminance/color difference signals, formed into a stereoscopic image by the stereoscopic image signal processing device 133, and then outputted to the monitor 16 through the video encoder 134. As a result, an image recorded in the recording media 140 is reproduced and displayed on the monitor 16 (reproduction of one image). As for an image taken by the 2D image mode, a plane image is displayed on the entire screen of the monitor 16 in the 2D mode.

Frame advancing of image is performed by left and right key operations of the arrow buttons 26. When the right key of the arrow buttons 26 is pressed, the next image file is read out from the recording media 140 and is reproduced and displayed on the monitor 16. When the left key of the arrow buttons is pressed, the previous image file is read out from the recording media 140 and is reproduced and displayed on the monitor 16.

Images recorded in the recording media 140 can be deleted as necessary while checking the images reproduced and displayed on the monitor 16. The images are deleted by pressing the MENU/OK button 25 when the images are reproduced and displayed on the monitor 16.

(2) When 3D Imaging Mode is Set

The imaging element 122 and the imaging element 123 start imaging for photographing checking image. More specifically, the imaging element 122 and the imaging element 123 consecutively take images of the same subject and consecutively process the image signals to generate stereoscopic image data for photographing checking image. The CPU 110 sets the monitor 16 to the 3D mode. The video encoder 134 sequentially converts the generated image data to a signal format for display, and the images are outputted to the monitor 16. As a result, stereoscopic image data for photographing checking image is displayed on the monitor 16.

The user performs framing while watching the photographing checking image displayed on the monitor 16, checks the subject to be imaged, checks the image after imaging, or sets the imaging conditions.

An S1 ON signal is inputted to the CPU 110 when the release switch 20 is half-pressed during the imaging standby state. The CPU 110 detects the signal and performs AE photometry and AF control. One of the right imaging system 12 and the left imaging system 13 (the left imaging system 13 in the present embodiment) performs the AE photometry. The right imaging system 12 and the left imaging system 13 perform the AF control. The AE photometry and the AF control are the same as in the 2D imaging mode, and the detailed description will not be repeated.

An S2 ON signal is inputted to the CPU 110 when the release switch 20 is full-pressed. The CPU 110 executes imaging and recording processes in response to the S2 ON signal. The process for generating the image data taken by the right imaging system 12 and the left imaging system 13 is the same as in the 2D imaging mode, and the description will not be repeated.

Two compressed image data are generated from two image data generated by the CDS/AMPs 124 and 125 by the same method as in the 2D imaging mode. The two compressed image data are associated and stored in the storage media 137 as one file. An MP format, etc. can be used as a storage format.

When the mode of the compound-eye digital camera 1 is set to the reproduction mode, the CPU 110 outputs a command to the media controller 136 to cause the recording media 140 to read out the lastly recorded image file.

The compressed image data of the read out image file is added to the compression/decompression processing device 132, decompressed to uncompressed luminance/color difference signals, and formed into a stereoscopic image by the stereoscopic image signal processing device 133. Information of the zoom position during imaging is stored in the image file, and the stereoscopic image signal processing device 133 cuts out a right eye image and a left eye image used for reproduction from the right eye image and the left eye image based on the information of the zoom position during imaging to generate an image for display from the right eye image and the left eye image used for reproduction.

The stereoscopic image signal processing device 133 outputs the image for display to the monitor 16 through the video encoder 134. As a result, an image recorded in the recording media 140 is stereoscopically reproduced and displayed on the monitor 16 (reproduction of one image).

Frame advancing of image is performed by left and right key operations of the arrow buttons 26. When the right key of the arrow buttons 26 is pressed, the next image file is read out from the recording media 140 and is reproduced and displayed on the monitor 16. When the left key of the arrow buttons is pressed, the previous image file is read out from the recording media 140 and is reproduced and displayed on the monitor 16.

Figure 3A:
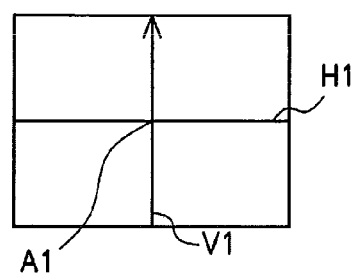
FIG. 3A is a pattern diagram of a chart of an imaging target.
Figure 3B:
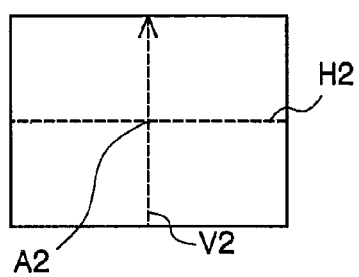
FIG. 3B is a pattern diagram of a left eye image taken by a left imaging system.
Figure 3C:
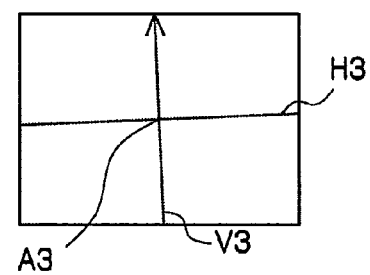
FIG. 3C is a pattern diagram of a right eye image taken by a right imaging system.

In the present embodiment, part of an image can be enlarged and displayed while checking the image reproduced and displayed on the monitor 16. FIGS. 3A, 3B, and 3C are pattern diagrams illustrating relationships between a right eye image and a left eye image when an image for right eye and an image for left eye are taken by the compound-eye digital camera 1. FIG. 3A illustrates a chart as a subject. FIG. 3B illustrates a left eye image as a result of taking the subject illustrated in FIG. 3A by the left imaging system 13. FIG. 3C illustrates a right eye image as a result of taking the subject illustrated in FIG. 3A by the right imaging system 12.

Upon shipment of the compound-eye digital camera 1, base lengths and angles of convergence of the right imaging system 12 and the left imaging system 13 are mechanically and electrically adjusted so that a center A of the subject at a distance of a predetermined distance (for example, 2 meters) is imaged at a center A1 of the left eye image as illustrated in FIG. 3B and imaged at a center A2 of the right eye image as illustrated in FIG. 3C.

However, there are rotations (rotational deviation) in the right imaging system 12 and the left imaging system 13 (inclined in rotation directions). If there is no rotation, horizontal and perpendicular lines of the chart are horizontally and vertically imaged in the right eye image and the left eye image. However, there is actually no lens without rotation. Even if the lenses are adjusted, the lenses cannot be completely matched. Therefore, the horizontal and vertical lines of the chart are inclined and imaged in the right eye image and the left eye image. In the pattern diagrams illustrated in FIGS. 3A, 3B, and 3C, an imaging result H2 of a horizontal line H1 of the chart illustrated in FIG. 3A is horizontal in the left eye image illustrated in FIG. 3B, and an imaging result V2 of a vertical line V1 of the chart is vertical. However, an imaging result H3 of the horizontal line H1 of the chart is inclined counterclockwise relative to the horizontal direction in the right eye image illustrated in FIG. 3C, and an imaging result V3 of the vertical line V1 of the chart is inclined counterclockwise relative to the vertical direction.

Figure 4:
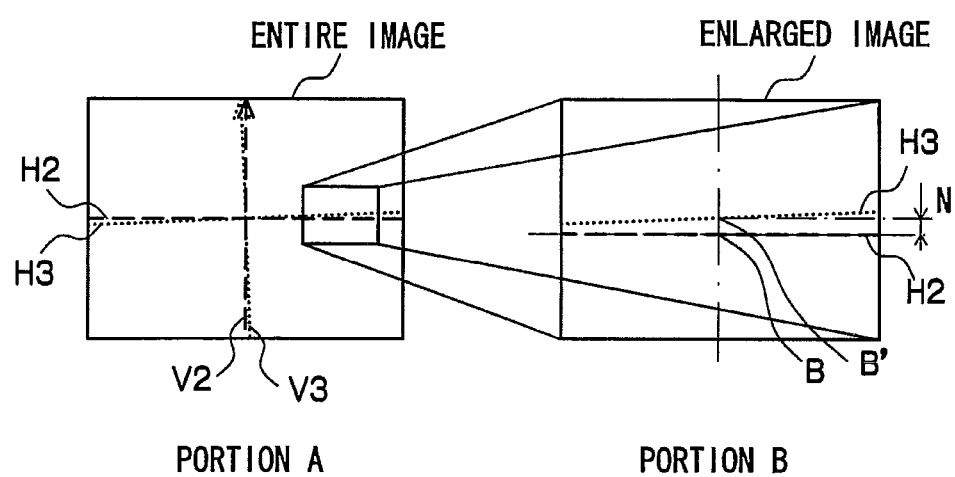
FIG. 4 is pattern diagram illustrating enlargement and display of part of an entire image, PORTION A of FIG. 4 illustrating the entire image, PORTION B of FIG. 4 illustrating an enlarged image.

Even if there is a rotation, if the entire right eye image and the left eye image (entire images) used for reproduction that are cut out by the stereoscopic image signal processing device 133 are displayed on the monitor 16 as illustrated in FIG. 4 (PORTION A), the center of the right eye image used for reproduction and the center of the left eye image used for reproduction match. Therefore, there is no parallax deviation, and appropriate stereoscopic vision is possible. However, if a partial area at a position moved in the horizontal direction from the center of the entire image is extracted, enlarged, and displayed on the monitor 16, the centers of the right eye image and the left eye image are deviated in the vertical direction by a deviation amount t as illustrated in FIG. 4 (PORTION B). Stereoscopic vision is difficult due to such a parallax deviation.

Figure 5:
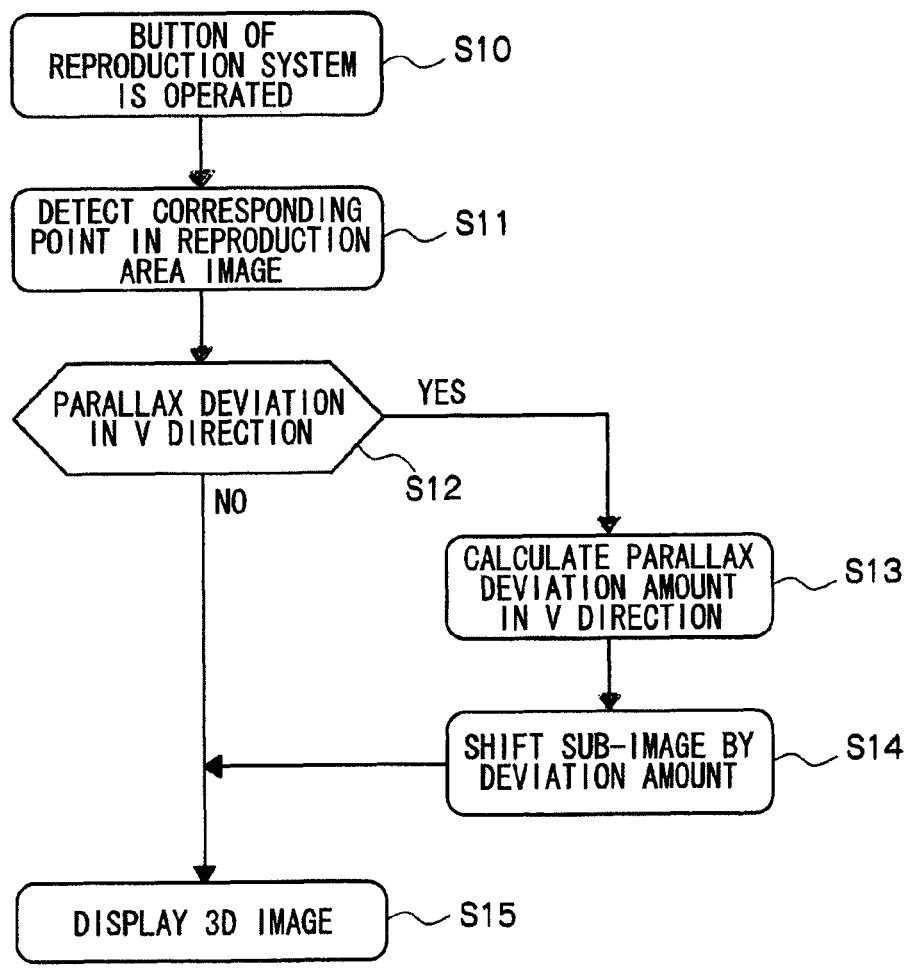
FIG. 5 is a flow chart illustrating a flow of a process of eliminating deviation at the center of a right eye image and a left eye image when an area moved in a horizontal direction from the center of an entire image of the compound-eye digital camera is enlarged and displayed on a monitor.

FIG. 5 is a flow chart illustrating a flow of a process of eliminating deviation at the centers of the right eye image and the left eye image when an area moved in the horizontal direction from the center of the entire image is enlarged and displayed on the monitor 16. The CPU 110 mainly executes the following process.

If an instruction indicating enlargement and display is inputted by the zoom button 21, and an instruction indicating a movement to the right or to the left is inputted by the arrow buttons 26 when the entire image is stereoscopically displayed on the monitor 16, the CPU 110 detects the instructions (step S10).

The stereoscopic image signal processing device 133 cuts out areas necessary for the enlargement and display from the right eye image and the left eye image used for the reproduction of the entire image based on input from the zoom button 21 and the arrow buttons 26. The feature point detection device 150 detects feature points from the left eye image cut out by the stereoscopic image signal processing device 133 as the area necessary for the enlargement and display and inputs the feature points to the corresponding point detection device 152. The corresponding point detection device 152 detects corresponding points corresponding to the feature points from the right eye image cut out as the area necessary for the enlargement and display (step S11). Various known methods can be used as the method of detecting the feature points and the corresponding points.

Among the feature points detected in step S11, the CPU 110 determines whether a feature point B positioned at the center or closest to the center of the left eye image cut out by the stereoscopic image signal processing device 133 and a corresponding point B' (see FIG. 4) corresponding to the feature point are deviated in the vertical direction (step S12).

If the points are not deviated in the vertical direction (no in step S12), the CPU 110 outputs the right eye image and the left eye image cut out by the stereoscopic image signal processing device 133 to the monitor 16 (step S15).

When the points are deviated in the vertical direction (yes in step S12), the feature point B positioned at the center or closest to the center of the left eye image cut out by the stereoscopic image signal processing device 133 and the corresponding point B' corresponding to the feature point are deviated in the vertical direction as illustrated in FIG. 4 (PORTION B). Therefore, the CPU 110 calculates the deviation amount t of the feature point B and the corresponding point B' in the vertical direction (step S13). The CPU 110 outputs the deviation amount t to the stereoscopic image signal processing device 133.

The stereoscopic image signal processing device 133 moves the right eye image (sub-image) cut out as the area necessary for the enlargement and display by the deviation amount t in parallel in the vertical direction to match the feature point B and the corresponding point B' (step S14). The stereoscopic image signal processing device 133 outputs the left eye image (reference image) cut out as the area necessary for the enlargement and display by the stereoscopic image signal processing device 133 and the right eye image (sub-image) moved in parallel in the vertical direction by the deviation amount t in step S14 to the monitor 16 through the video encoder 134 (step S15). As a result, an enlarged image, in which the parallax deviation is eliminated, is displayed on the monitor 16.

Images recorded in the recording media 140 can be deleted as necessary while checking the images reproduced and displayed on the monitor 16. The images are deleted by pressing the MENU/OK button 25 when the images are reproduced and displayed on the monitor 16.

According to the present embodiment, the parallax deviation in the vertical direction can be eliminated when the parallax deviation in the vertical direction generated by rotational deviation between the right imaging system and the left imaging system causes a large impact such as when an edge section in the horizontal direction of an image is extracted, enlarged, and displayed. Therefore, the stereoscopic vision of the enlarged and displayed image is facilitated.

Since the image is moved in parallel in the vertical direction in the present embodiment, the process is alleviated compared to when the image is rotated and moved, and the process can be finished in a short time. Therefore, a high parallax deviation correction effect can be obtained in a short processing time.

Although the sub-image is moved by the deviation amount t in step S14 in the present embodiment, the method of matching the feature point B and the corresponding point B' is not limited to this. For example, the feature point B and the corresponding point B' can be matched by moving the reference image and the sub-image by half each, i.e. by t/2, in the opposite directions.

<Second Embodiment>

Although a corresponding point is detected during reproduction of the stereoscopic image to eliminate the parallax deviation of the right eye image and the left eye image in the vertical direction in the first embodiment of the present embodiment, the method of eliminating the parallax deviation in the vertical direction is not limited to this.

A second embodiment of the presently disclosed subject matter is an embodiment in which a detection result upon shipment is used to eliminate the parallax deviation in the vertical direction. Hereinafter, a compound-eye digital camera 2 of the second embodiment will be described. The operations of the compound-eye digital camera 2 are the same as the compound-eye digital camera 1 except for a process of enlarging and displaying part of an image while checking the image reproduced and displayed on the monitor 16. Therefore, as for the actions of the compound-eye digital camera 2, only a process of enlarging and displaying part of an image while checking the image reproduced and displayed on the monitor 16 will be described. The same parts as in the first embodiment are designated with the same reference numerals, and the description will not be repeated.

Figure 6:
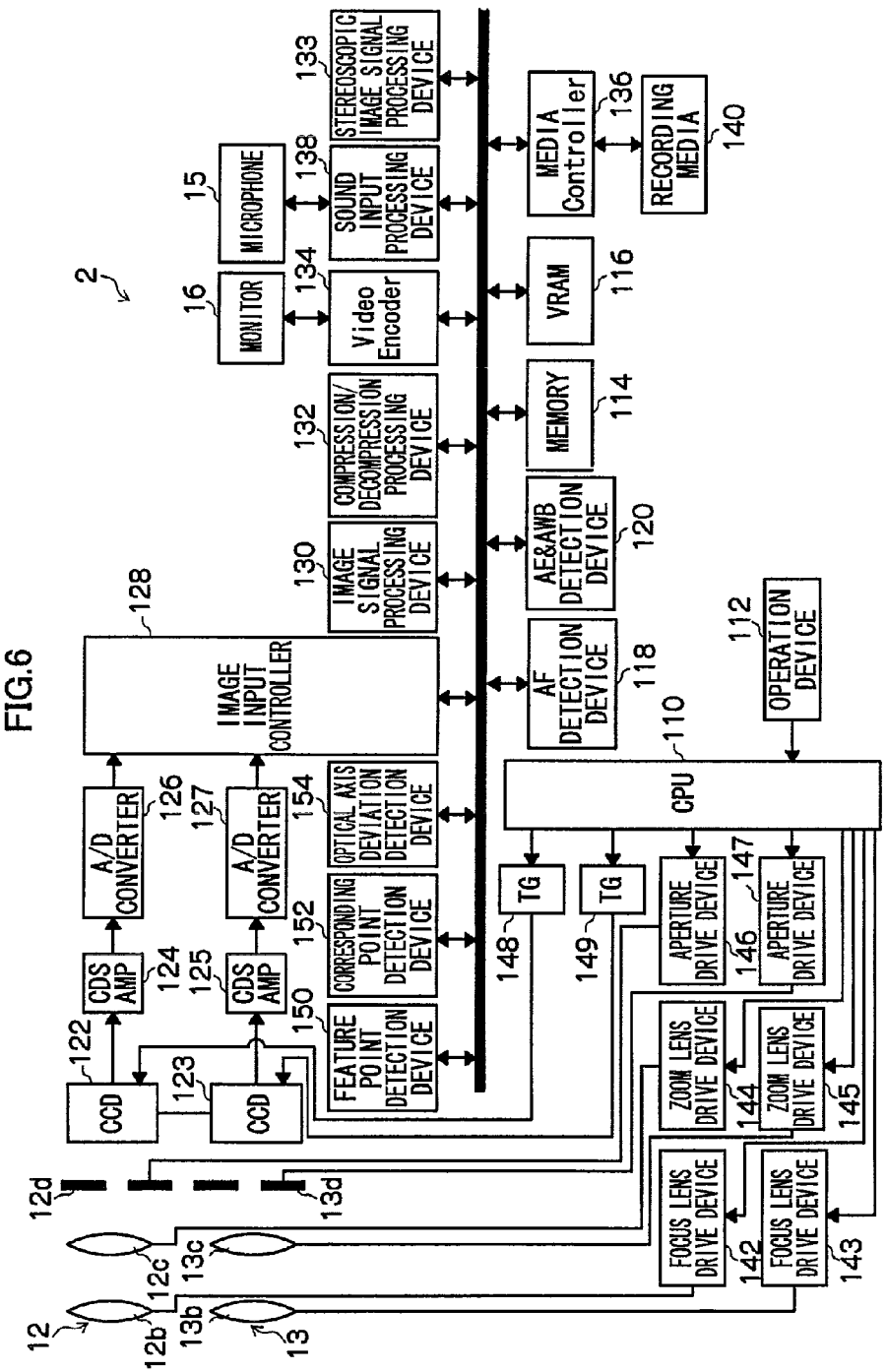
FIG. 6 is a block diagram illustrating an electrical configuration of a second embodiment of the presently disclosed subject matter.

FIG. 6 is a block diagram illustrating a main internal configuration of the compound-eye digital camera 2. The compound-eye digital camera 2 includes the CPU 110, the operation device (such as the release button 20, the MENU/OK button 25, and the arrow button 26) 112, the SDRAM 114, the VRAM 116, the AF detection device 118, the AE/AWB detection device 120, the imaging elements 122 and 123, the CDS/AMPs 124 and 125, the A/D converters 126 and 127, the image input controller 128, the image signal processing device 130, the compression/decompression processing device 132, the stereoscopic image signal processing device 133, the video encoder 134, the media controller 136, the sound input processing device 138, the recording media 140, the focus lens drive devices 142 and 143, the zoom lens drive devices 144 and 145, the aperture drive devices 146 and 147, the timing generators (TG) 148 and 149, the feature point detection device 150, the corresponding point detection device 152, and an optical axis deviation detection device 154.

The optical axis deviation detection device 154 inspects deviations in the vertical direction between left and right eye images and an imaging target upon the inspection of the compound-eye digital camera 2. The optical axis deviation detection device 154 outputs the detection result to the SDRAM 114, and the detection result is stored in the SDRAM 114.

Upon shipment of the compound-eye digital camera 2, base lengths and angles of convergence of the right imaging system 12 and the left imaging system 13 are mechanically and electrically adjusted as in the compound-eye digital camera 1 so that the center of the subject at a distance of a predetermined distance is imaged at the centers of the left eye image and the right eye image. However, rotations (rotational deviation) of the right imaging system 12 and the left imaging system 13 cannot be completely matched. Therefore, the deviation in the vertical direction caused by the rotational deviation is inspected for the right imaging system 12 and the left imaging system 13.

Figure 7:
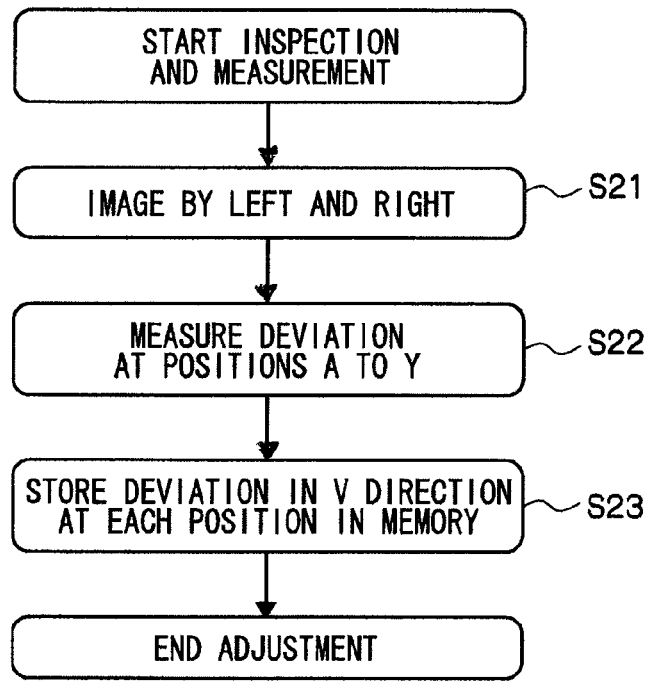
FIG. 7 is a flow chart illustrating a flow of a process during inspection of a compound-eye digital camera.

FIG. 7 is a flow chart illustrating a flow of a process of inspecting rotational deviation of the right imaging system 12 and the left imaging system 13. The optical axis deviation detection device 154 mainly executes the following process.

Figure 8:
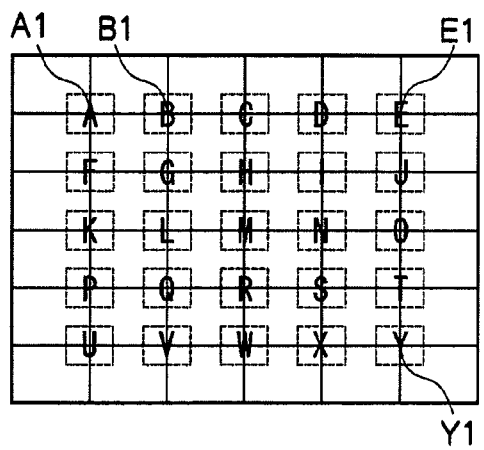
FIG. 8 is a pattern diagram of a chart of an imaging target during inspection of the compound-eye digital camera.

As illustrated in FIG. 8, the CPU 110 sets a chart including lines drawn in mesh to cross points and uses the right imaging system 12 and the left imaging system 13 to image the chart to take the right eye image and the left eye image (step S21). The CPU 110 outputs the imaging result to the optical axis deviation detection device 154.

The optical axis deviation detection device 154 stores, in advance, information of positions of the lines of the chart of the imaging target and positions where the lines intersect (centers of areas A to Y in the case of FIG. 8). For each of the right eye image and the left eye image, the optical axis deviation detection device 154 detects the positions where the lines intersect from the areas A to Y. For each of the right eye image and the left eye image, the optical axis deviation detection device 154 compares the detected positions and the positions stored in advance to measure the deviation amounts in the vertical direction between the positions (step S22).

Figure 9:
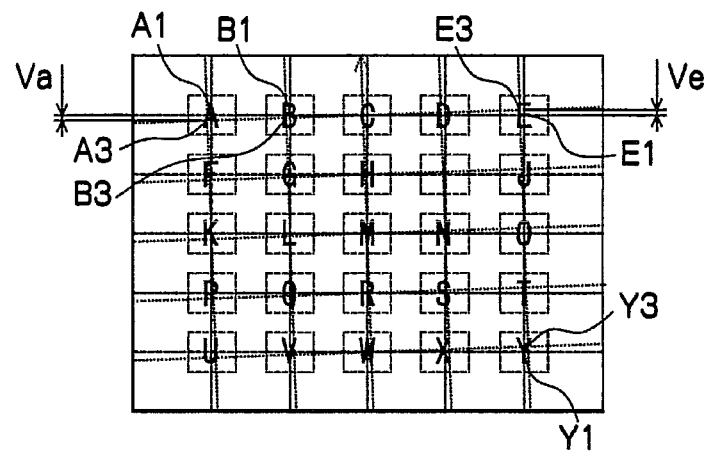
FIG. 9 is a pattern diagram of a right eye image taken by a right imaging system during inspection of the compound-eye digital camera.

Step S22 will be described with reference to FIG. 9. FIG. 9 is a pattern diagram in which the right eye image taken in step S21 and the chart of the imaging target are placed on top of each other. The optical axis deviation detection device 154 detects a position A3 where lines intersect from inside the area A of the right eye image. If a position where lines intersect is not detected from the area A, the optical axis deviation detection device 154 enlarges the area A by a predetermined range to detect the position where lines intersect. The optical axis deviation detection device 154 then measures a distance Va in the vertical direction between a center A1 of the area A of the chart and the position A3 of the right eye image where lines intersect. The distance Va is a deviation amount Va in the area A. By the same method, distances between centers B1 to Y1 and positions B3 to Y3 of the right eye image where lines intersect, i.e. deviation amounts Vb to Vy, are measured in the areas B to Y. The deviation amounts Va to Vy are calculated as positive values if the deviation is upward in the vertical direction as illustrated in the area E and calculated as negative values if the deviation is downward in the vertical direction as illustrated in the area A. The values of the deviation amounts Va to Vy can be positive or negative.

In the present embodiment, the deviation amounts in the vertical direction in the areas A to Y are measured and recorded in each of the right eye image and the left eye image. This is because the cut-out positions of the entire image vary depending on the distance, parallax, etc. of the subject to be imaged. This will be described with reference to FIGS. 10, 11A, 11B, 12A and 12B.

Figure 10:
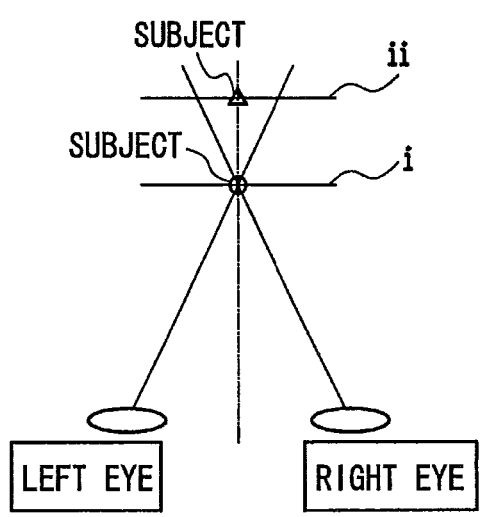
FIG. 10 is a pattern diagram illustrating a positional relationship between the position of an imaging target and the compound-eye digital camera.

The position illustrated with "i" in FIG. 10 is a position where the rotational deviation between the right imaging system 12 and the left imaging system 13 is inspected as illustrated in FIG. 7. When a subject at the position illustrated with i in FIG. 10, i.e. subject on the cross point, is imaged, the center of the right eye image taken by the right imaging system 12 and the center of the right eye image necessary for the reproduction of the entire image cut out by the stereoscopic image signal processing device 133 match as illustrated in FIGS. 11A and 11B, and the center of the left eye image taken by the left imaging system 13 and the center of the left eye image necessary for the reproduction of the entire image cut out by the stereoscopic image signal processing device 133 match. Such a case can be handled if only a relative value of the deviation amount between the right eye image and the left eye image is measured and stored.

On the other hand, when a subject not on the cross point is imaged, the center of the right eye image taken by the right imaging system 12 and the center of the right eye image necessary for the reproduction of the entire image cut out by the stereoscopic image signal processing device 133 do not match, and the center of the left eye image taken by the left imaging system 13 and the center of the left eye image necessary for the reproduction of the entire image cut out by the stereoscopic image signal processing device 133 do not match.

An example of imaging a subject that is at the position illustrated with "ii" in FIG. 10, i.e. position deeper than the cross point, and that is on the center axes of the right imaging system 12 and the left imaging system 13 will be considered. If the left imaging system 13 images the subject, the subject is imaged on the left side of the center of the left eye image as illustrated in FIG. 12A. If the right eye image 12 images the subject, the subject is imaged on the right side of the center of the right eye image as illustrated in FIG. 12B. Therefore, the left eye image used for the reproduction of the entire image is cut out so that the center of the left eye image used for the reproduction of the entire image is positioned on the left side of the photographed left eye image. The right eye image used for the reproduction of the entire image is cut out so that the center of the right eye image used for the reproduction of the entire image is positioned on the right side of the photographed right eye image.

Figure 13A:
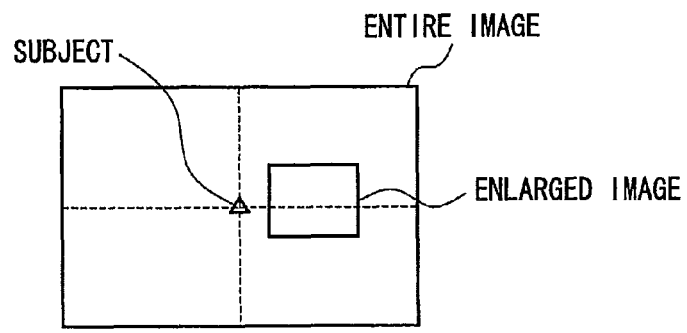
FIGS. 13A, 13B, and 13C are diagrams illustrating a relationship between images taken when there is a subject at the position of ii of FIG. 10 and images for reproduction, FIG. 13A illustrating a relationship between an entire image and an enlarged image displayed on the monitor, FIG. 13B illustrating a relationship between a left eye image and an area used for enlargement and display during the display of the entire image, FIG. 13C illustrating a relationship between a right eye image and an area used for enlargement and display during the display of the entire image.
Figure 13B:
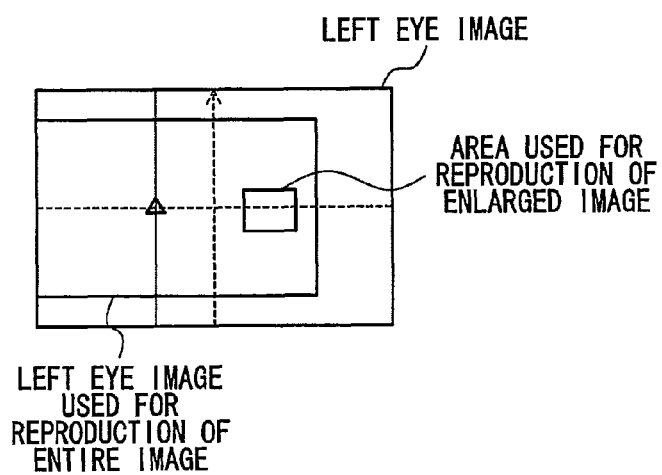
Figure 13C:
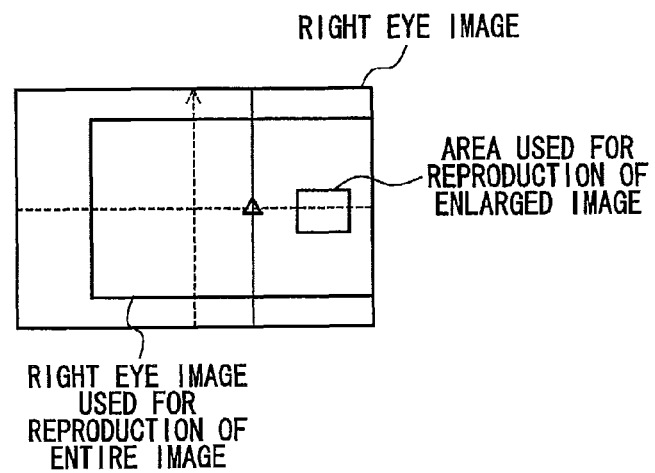

If an instruction indicating enlargement and display of an area horizontally moved to the right is inputted from the entire image as illustrated in FIG. 13A when the cut out right eye image and the left eye image are displayed on the monitor 16, the center of the area necessary for the enlargement and display of the left eye image is at a position on the right side of the center of the left eye image as illustrated in FIG. 13B (for example, substantially at the center position between the areas M and N of FIG. 8), and the area necessary for the enlargement and display of the right eye image is at a position on the right side of the right eye image as illustrated in FIG. 13C (for example, substantially the center of the area N of FIG. 8).

If only the relative value of the deviation amount between the right eye image and the left eye image is measured and stored, a case in which the area necessary for the enlargement and display varies between the right eye image and the left eye image cannot be handled. Therefore, absolute values of the deviation amounts Va to Vy in the areas A to Y need to be measured and saved for each of the right eye image and the left eye image.

When the deviation amounts in the vertical direction are measured, the optical axis deviation detection device 154 associates the deviation amounts of the areas measured in step S22 with the areas where the deviation amounts are measured and outputs the deviation amounts and the areas to the SDRAM 114. The detection result is stored as a table in which the deviation amounts and the areas where the deviation amounts are measured are associated (step S23).

Figure 14:
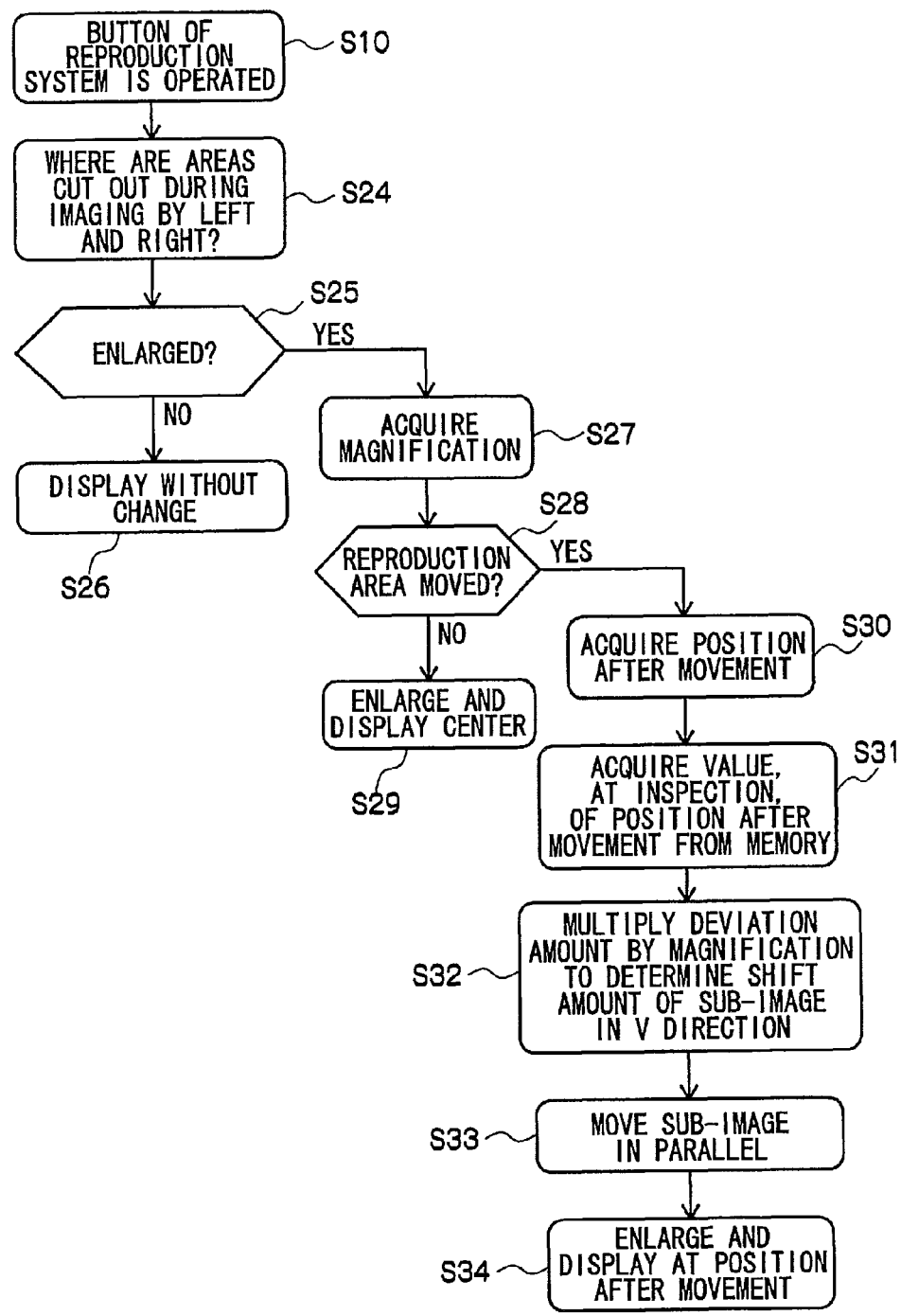
FIG. 14 is a flow chart illustrating a flow of a process of eliminating deviation at the center of a right eye image and a left eye image when an area moved in a horizontal direction from the center of an entire image of the compound-eye digital camera is enlarged and displayed on a monitor.

Operations of the compound-eye digital camera 2 configured this way will be described. FIG. 14 is a flow chart illustrating a flow of a process of eliminating deviation in the centers of the right eye image and the left eye image when an area moved in the horizontal direction from the center of the entire image reproduced and displayed on the monitor 16 is enlarged and displayed on the monitor 16. The CPU 110 mainly executes the following process.

If an instruction indicating enlargement and display is inputted by the zoom button 21, and an instruction indicating a movement to the right or to the left is inputted by the arrow buttons 26 when the entire image is displayed on the monitor 16, the CPU 110 detects the instructions (step S10).

In the CPU 110, the stereoscopic image signal processing device 133 detects which areas of the photographed right eye image and left eye image are the areas cut out from the right eye image and the left eye image used for the reproduction of the entire image (step S24).

The CPU 110 determines whether an instruction indicating the enlargement and display is inputted by the zoom button 21 in step S10 (step S25). If the instruction indicating the enlargement and display is not inputted ("NO" in step S25), the display to the monitor 16 is not changed (step S26).

If the instruction indicating the enlargement and display is inputted ("YES" in step S25), the CPU 110 acquires information indicating the magnification of the instruction indicating the enlargement and display (step S27) and determines whether an instruction indicating the movement of a reproduction area is inputted from the arrow buttons 26 in step S10 (step S28).

If the instruction indicating the movement of the reproduction area is not inputted from the arrow buttons 26 ("NO" in step S28), only the instruction indicating the enlargement and display is inputted. Therefore, the CPU 110 outputs the magnification detected in step S27 to the stereoscopic image signal processing device 133. The stereoscopic image signal processing device 133 cuts out areas necessary for the enlargement and display from the right eye image and the left eye image in accordance with the magnification inputted from the CPU 110 and outputs the areas to the monitor 16 through the video encoder 134. As a result, the center of the entire image is enlarged and displayed on the monitor 16 with the instructed magnification (step S29). In this case, there is no parallax deviation between the center of the enlarged and displayed right eye image and the center of the enlarged and displayed left eye image. Therefore, there is no need to correct the parallax deviation.

If the instruction indicating the movement of the reproduction area is inputted from the arrow buttons 26 ("YES" in step S28), the instruction indicating the enlargement and display and the instruction indicating the movement of the reproduction area are inputted. Therefore, the CPU 110 detects the movement amount in the instruction indicating the movement inputted in step S10 and outputs the detected movement amount and the magnification detected in step S27 to the stereoscopic image signal processing device 133. The stereoscopic image signal processing device 133 calculates areas to be cut out from the right eye image and the left eye image based on the inputted movement amount and magnification and detects, for each of the right eye image and the left eye image, which of the centers of the areas A to Y of FIG. 8 the center of the area to be cut out is closest to (step S30). The stereoscopic image signal processing device 133 outputs the detection result to the CPU 100.

The CPU 110 acquires, from the SDRAM 114, the deviation amount associated with the area detected to be closest in step S24 (step S31). For example, if the center of the area necessary for the enlargement and display of the left eye image is closest to the center of the area N as illustrated in FIG. 12B, the CPU 110 acquires the deviation amount Vn associated with the area N from the SDRAM 114. If the center of the area necessary for the enlargement and display of the right eye image is closest to the center of the area M as illustrated in FIG. 12C, the CPU 110 acquires the deviation amount associated with the area M (the deviation amount is 0 because the area M is the center of the right eye image) from the SDRAM 114.

The CPU 110 multiplies the deviation amount of the right eye image and the left eye image acquired in step S31 by the magnification acquired in step S27 to correct the deviation amount. For example, if the magnification acquired in step S27 is X, the deviation amount of the left eye image in the case illustrated in FIGS. 12B and 12C is corrected to X×Vn=XVn, and the deviation amount of the right eye image is corrected to 0. The CPU 110 then calculates a shift amount of the sub-image relative to the reference image (relative value of the deviation amount of the sub-image of the reference image) based on the corrected deviation amount using Expression 1 (step S32).

(Shift amount of sub-image)=(deviation amount of reference image after correction)−(deviation amount of sub-image after cutting out)   [Expression 1]

The CPU 110 inputs the shift amount calculated in step S32 to the stereoscopic image signal processing device 133. The stereoscopic image signal processing device 133 cuts out the area to be cut out obtained in step S30 from the right eye image used for the reproduction of the entire image and moves the cut out right eye image in parallel in the vertical direction by the inputted shift amount (step S33). If the left eye image is the reference image in the case illustrated in FIGS. 12B and 12C, the movement amount of the right eye image as the sub-image is calculated as XVn−0=XVn. Therefore, the CPU 110 moves the right eye image in the vertical direction by the deviation amount XVn.

The stereoscopic image signal processing device 133 cuts out the area to be cut out obtained in step S30 from the left eye image used for the reproduction of the entire image. An image for display is generated from the cut out left eye image (reference image) and the right eye image (sub-image) moved in the vertical direction in step S33, and the image is outputted to the monitor 16 (step S34). As a result, the enlarged image after the elimination of the parallax deviation is displayed on the monitor 16.

According to the present embodiment, the parallax deviation in the vertical direction can be eliminated when the parallax deviation in the vertical direction generated by rotational deviation between the right imaging system and the left imaging system causes a large impact such as when an edge section in the horizontal direction of an image is extracted, enlarged, and displayed. The measurement result during inspection is used to eliminate the parallax deviation. Therefore, there is no need to execute image processing, such as detecting the feature points and corresponding points, every time the image is reproduced. Therefore, the enlarged image can be displayed in a short time.

According to the present embodiment, deviation amounts at a plurality of areas in each of the right eye image and the left eye image are measured and stored. Therefore, the sub-image can be moved in parallel by an appropriate deviation amount even if the right eye image and the left eye image are deformed by distortion, etc. Particularly, the present embodiment is effective for moving images.

Figure 15:
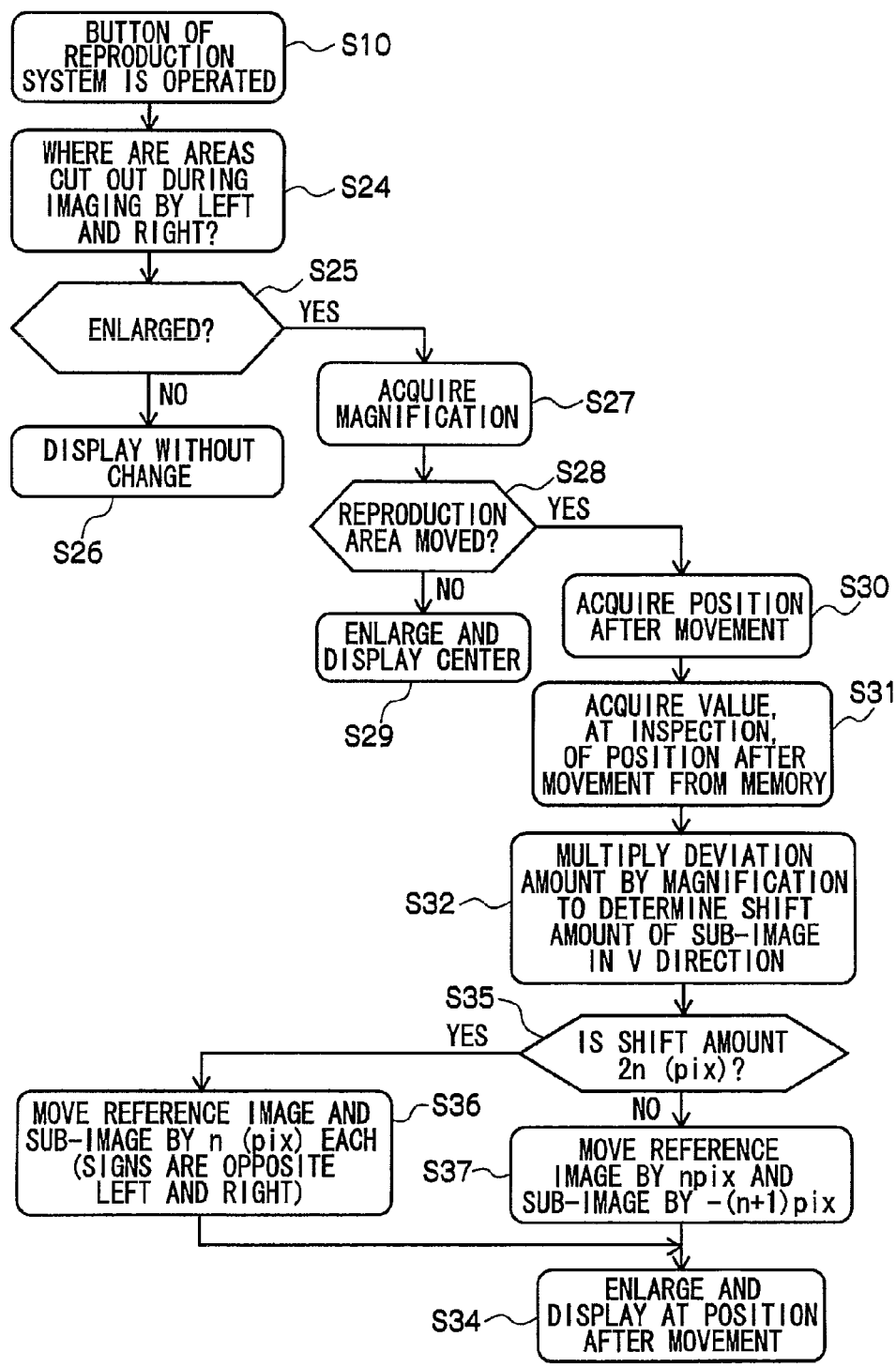
FIG. 15 is a flow chart illustrating a flow of a process of eliminating deviation at the center of a right eye image and a left eye image when an area moved in a horizontal direction from the center of an entire image is enlarged and displayed on a monitor in a modified example of the compound-eye digital camera.

Although the parallax deviation is eliminated by moving the sub-image by the shift amount calculated in step S33 in the present embodiment, both the reference image and the sub-image may be moved. FIG. 15 is a flow chart illustrating a flow of a process of eliminating the parallax deviation by moving both the reference image and the sub-image.

If an instruction indicating enlargement and display is inputted by the zoom button 21, and an instruction indicating a movement to the right or to the left is inputted by the arrow buttons 26 when the entire image is displayed on the monitor 16, the CPU 110 detects the instructions (step S10).

In the CPU 110, the stereoscopic image signal processing device 133 detects which areas of the photographed right eye image and left eye image are the areas cut out from the right eye image and the left eye image used for the reproduction of the entire image (step S24).

The CPU 110 determines whether an instruction indicating the enlargement and display is inputted by the zoom button 21 in step S10 (step S25). If the instruction indicating the enlargement and display is not inputted ("NO" in step S25), the display to the monitor 16 is not changed (step S26).

If the instruction indicating the enlargement and display is inputted ("YES" in step S25), the CPU 110 acquires information indicating the magnification of the instruction indicating the enlargement and display (step S27) and determines whether an instruction indicating the movement of a reproduction area is inputted from the arrow buttons 26 in step S10 (step S28).

If the instruction indicating the movement of the reproduction area is not inputted from the arrow buttons 26 ("NO" in step S28), only the instruction indicating the enlargement and display is inputted. Therefore, the CPU 110 outputs the magnification detected in step S27 to the stereoscopic image signal processing device 133. The stereoscopic image signal processing device 133 cuts out areas necessary for the enlargement and display from the right eye image and the left eye image in accordance with the magnification inputted from the CPU 110 and outputs the areas to the monitor 16 through the video encoder 134. As a result, the center of the entire image is enlarged and displayed on the monitor 16 with the instructed magnification (step S29).

If the instruction indicating the movement of the reproduction area is inputted from the arrow buttons 26 ("YES" in step S28), the instruction indicating the enlargement and display and the instruction indicating the movement of the reproduction area are inputted. Therefore, the CPU 110 detects the movement amount in the instruction indicating the movement inputted in step S10 and outputs the detected movement amount and the magnification detected in step S27 to the stereoscopic image signal processing device 133. The stereoscopic image signal processing device 133 calculates areas to be cut out from the right eye image and the left eye image based on the inputted movement amount and magnification and detects, for each of the right eye image and the left eye image, which of the centers of the areas A to Y of FIG. 8 the center of the area to be cut out is closest to (step S30). The stereoscopic image signal processing device 133 outputs the detection result to the CPU 100.

The CPU 110 acquires, from the SDRAM 114, the deviation amount associated with the area detected to be closest in step S24 (step S31). The CPU 110 multiplies the deviation amount of the right eye image and the left eye image acquired in step S31 by the magnification acquired in step S27 to correct the deviation amount. The CPU 110 then calculates a shift amount of the sub-image relative to the reference image based on the corrected deviation amount using Expression 1 (step S32).

The CPU 110 inputs the shift amount calculated in step S32 to the stereoscopic image signal processing device 133. The stereoscopic image signal processing device 133 determines whether the inputted shift amount is 2n (n is a natural number) pixels (step S35).

The stereoscopic image signal processing device 133 cuts out the area to be cut out obtained in step S30 from the left eye image used for the reproduction of the entire image and cuts out the area to be cut out obtained in step S30 from the right eye image used for the reproduction of the entire image. If the shift amount is 2n pixels (YES in step S35), the stereoscopic image signal processing device 133 moves the cut out left eye image (hereinafter, called "cut out reference image") and the cut out right eye image (hereinafter, called "cut out sub-image") in the opposite directions by n pixels. More specifically, the stereoscopic image signal processing device 133 moves the cut out left eye image in the vertical direction by n pixels and moves the cut out sub-image in parallel in the vertical direction by −n pixels (step S36).

If the shift amount is not 2n pixels, in other words, if the shift amount is 2n+1 pixels (YES in step S35), the stereoscopic image signal processing device 133 moves the cut out reference image by n pixels and moves the cut out sub-image in the opposite direction by n+1 pixels (step S37).

The CPU 110 generates an image for display from the cut out reference image and the cut out sub-image moved in the vertical directions in step S36, or from the cut out reference image and the cut out sub-image moved in the vertical directions in step S37, and outputs the image to the monitor 16 (step S34). As a result, an enlarged image, in which the parallax deviation is eliminated, is displayed on the monitor 16.

According to the present modified example, an unnecessarily large reproduction margin is not required because the right eye image and the left eye image are equally moved. Therefore, the stereoscopic image can be taken more in the wide-angle side. The equal movement of the right eye image and the left eye image may also be applied to the first embodiment.

<Third Embodiment>

Although the deviation amount in the vertical direction is measured in the inspection upon the shipment, and the measurement result is used to eliminate the parallax deviation in the vertical direction in the first embodiment of the presently disclosed subject matter, the method of eliminating the parallax deviation in the vertical direction is not limited to this.

A third embodiment of the presently disclosed subject matter is an embodiment in which the deviation amount in the rotation direction is measured in the inspection upon the shipment, and the measurement result is used to eliminate the parallax deviation in the vertical direction. Hereinafter, a compound-eye digital camera 3 of the third embodiment will be described. Operations of the compound-eye digital camera 3 are the same as in the compound-eye digital cameras 1 and 2 except for a process of enlarging and displaying part of an image while checking the image reproduced and displayed on the monitor 16. Therefore, as for the operations of the compound-eye digital camera 3, only the process of enlarging and displaying part of an image while checking the image reproduced and displayed on the monitor 16 will be described. The same parts as in the first and second embodiments are designated with the same reference numerals, and the description will not be repeated.

Figure 16:
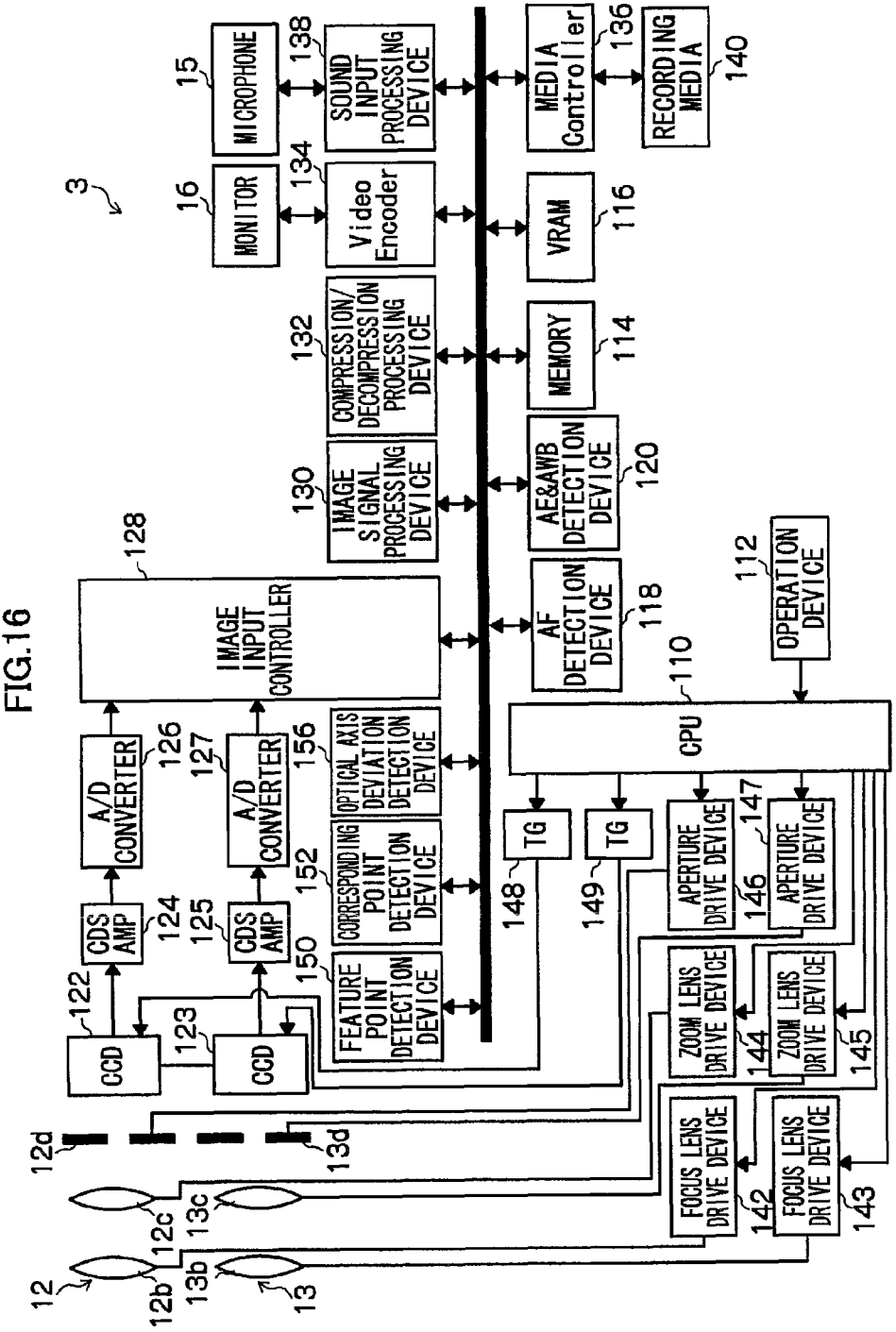
FIG. 16 is a block diagram illustrating an electrical configuration of a compound-eye digital camera of a third embodiment of the presently disclosed subject matter.

FIG. 16 is a block diagram illustrating a main internal configuration of the compound-eye digital camera 3. The compound-eye digital camera 3 includes the CPU 110, the operation device (such as the release button 20, the MENU/OK button 25, and the arrow button 26) 112, the SDRAM 114, the VRAM 116, the AF detection device 118, the AE/AWB detection device 120, the imaging elements 122 and 123, the CDS/AMPs 124 and 125, the A/D converters 126 and 127, the image input controller 128, the image signal processing device 130, the compression/decompression processing device 132, the stereoscopic image signal processing device 133, the video encoder 134, the media controller 136, the sound input processing device 138, the recording media 140, the focus lens drive devices 142 and 143, the zoom lens drive devices 144 and 145, the aperture drive devices 146 and 147, the timing generators (TG) 148 and 149, the feature point detection device 150, the corresponding point detection device 152, and an optical axis deviation detection device 156.

The optical axis deviation detection device 156 inspects deviations in the rotational direction (rotational deviations) between left and right eye images and an imaging target upon the inspection of the compound-eye digital camera 3. The optical axis deviation detection device 156 outputs the detection result to the SDRAM 114, and the detection result is stored in the SDRAM 114.

Upon shipment of the compound-eye digital camera 3, base lengths and angles of convergence of the right imaging system 12 and the left imaging system 13 are mechanically and electrically adjusted as in the compound-eye digital camera 1 so that the center of the subject at a distance of a predetermined distance is imaged at the centers of the left eye image and the right eye image. However, rotations (rotational deviation) of the right imaging system 12 and the left imaging system 13 cannot be completely matched. Therefore, the rotational deviation is inspected for each of the right imaging system 12 and the left imaging system 13.

Figure 17:
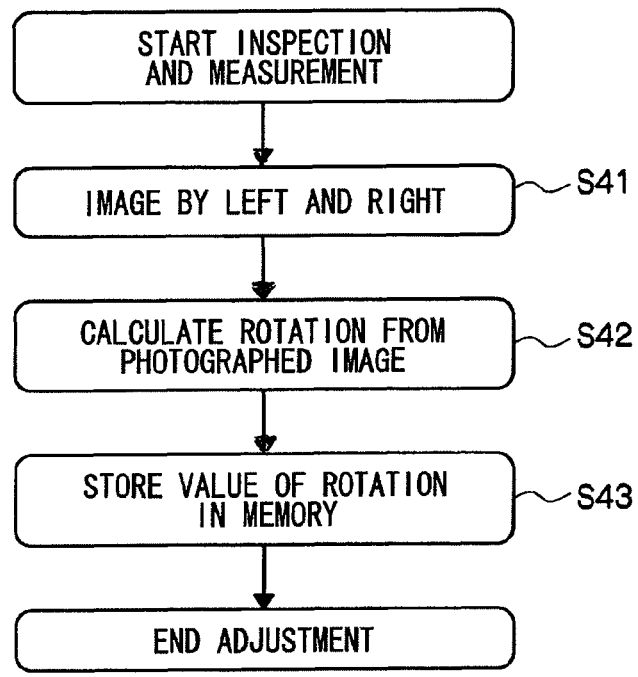
FIG. 17 is a flow chart illustrating a flow of a process during inspection of the compound-eye digital camera.

FIG. 17 is a flow chart illustrating a flow of a process of inspecting the rotation deviation between the right imaging system 12 and the left imaging system 13. The optical axis deviation detection device 156 mainly executes the following process.

The CPU 110 uses the right imaging system 12 and the left imaging system 13 to image the chart including lines drawn in a cross shape as illustrated in FIG. 3A to take a right eye image and a left eye image (step S41). The CPU 110 outputs the imaging result to the optical axis deviation detection device 156.

Figure 18:
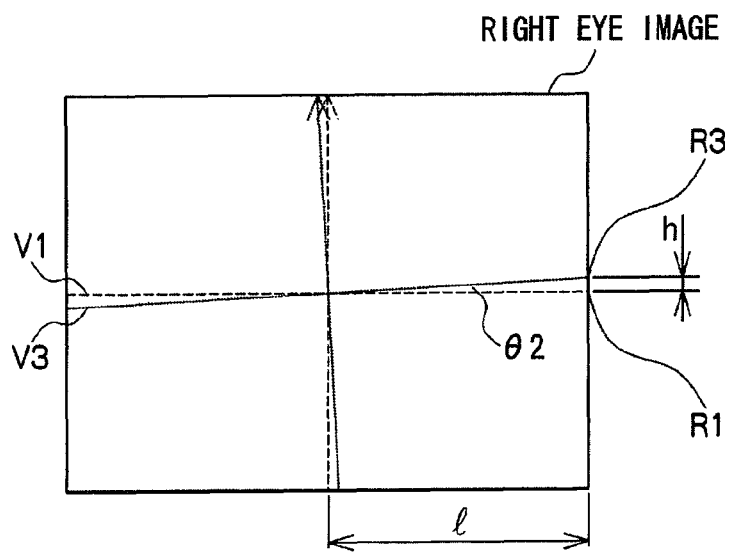
FIG. 18 is a pattern diagram of a right eye image taken by a right imaging system during inspection of the compound-eye digital camera.

The optical axis deviation detection device 156 measures a rotational deviation amount for each of the right eye image and the left eye image (step S42). As illustrated in FIG. 18, the optical axis deviation detection device 156 measures, in the right end of the right eye image, a deviation amount h in the vertical direction between an intersection R1 (substantially the center), which is an intersection of a horizontal line H1 of the chart and the right end, and an intersection R3, which is an intersection of a line V3 actually imaged in the right eye image and the right end, and divides the deviation amount h in the vertical direction by a length l in the horizontal direction to calculate a rotational deviation amount θ2 of the right eye image. A rotational deviation amount θ1 is calculated for the left eye image by the same method. It should be noted that the horizontal line H1 of the chart needs to be accurately set to be horizontal and that the vertical line V1 needs to be accurately set to be vertical to calculate absolute values of the rotational deviation amounts of the right eye image and the left eye image.

The calculation method of the rotational deviation amounts θ1 and θ2 is not limited to this. For example, although the rotational deviation amount is calculated based on the right end in FIG. 18, the calculation may be based not only on the right end, but also on the left end, the upper end, or the lower end. The angle may be directly measured without calculating the angle from the deviation amount in the vertical direction and the length in the horizontal direction.

Although the rotational deviation amounts θ1 and θ2 are calculated as absolute values in the present embodiment, relative values may be calculated. For example, if the left eye image is the reference, the rotational deviation amount θ1 is calculated for the left eye image as in the case of the absolute value. As for the right eye image that is not the reference, an angle of inclination of the right eye image when the inclination of the left eye image is assumed to be "0" can be calculated as a rotational deviation amount θ2'.

The optical axis deviation detection device 156 outputs the measured rotational deviation amounts θ1 and θ2 to the SDRAM 114, and the rotational deviation amounts θ1 and θ2 are stored in the SDRAM 114 (step S43).

Although absolute values of the rotational deviation amounts of the right eye image and the left eye image are calculated and stored in the process illustrated in FIG. 17, a relative difference between the rotational deviation amount of the right eye image and the rotational deviation amount of the left eye image may be calculated and stored.

Figure 19:
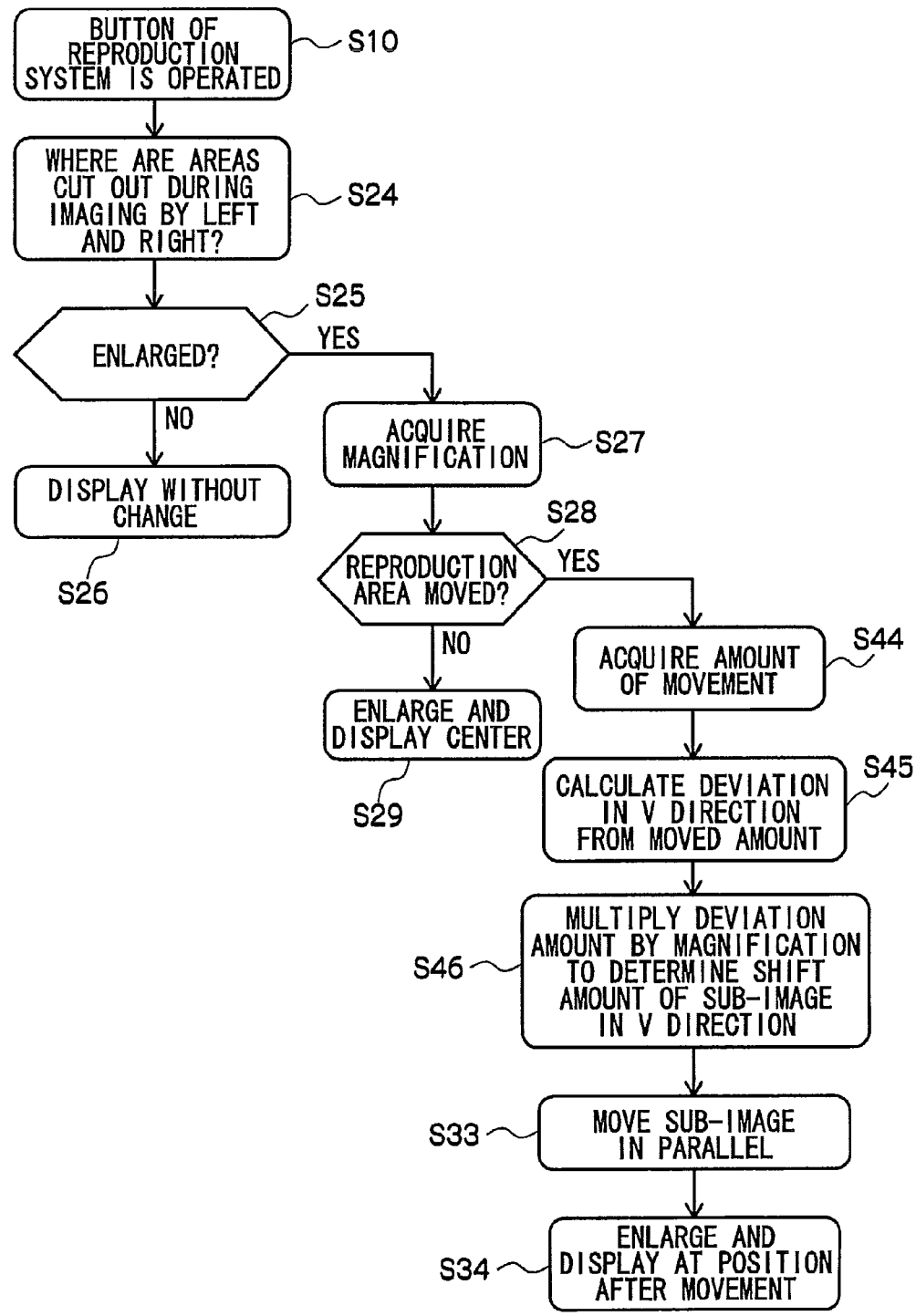
FIG. 19 is a flow chart illustrating a flow of a process of eliminating deviation at the center of a right eye image and a left eye image when an area moved in a horizontal direction from the center of an entire image of the compound-eye digital camera is enlarged and displayed on a monitor.

Operations of the compound-eye digital camera 3 configured this way will be described. FIG. 19 is a flow chart illustrating a flow of a process of eliminating deviation in the centers of a right eye image and a left eye image when an area moved in the horizontal direction from the center of the entire image reproduced and displayed on the monitor 16 is enlarged and displayed on the monitor 16. The CPU 110 mainly executes the following process.

If an instruction indicating enlargement and display is inputted by the zoom button 21, and an instruction indicating a movement to the right or to the left is inputted by the arrow buttons 26 when the entire image is displayed on the monitor 16, the CPU 110 detects the instructions (step S10).

In the CPU 110, the stereoscopic image signal processing device 133 detects which areas of the photographed right eye image and left eye image are the areas cut out from the right eye image and the left eye image used for the reproduction of the entire image (step S24).

The CPU 110 determines whether an instruction indicating the enlargement and display is inputted by the zoom button 21 in step S10 (step S25). If the instruction indicating the enlargement and display is not inputted ("NO" in step S25), the display to the monitor 16 is not changed (step S26).

If the instruction indicating the enlargement and display is inputted ("YES" in step S25), the CPU 110 acquires information indicating the magnification of the instruction indicating the enlargement and display (step S27) and determines whether an instruction indicating the movement of a reproduction area is inputted from the arrow buttons 26 in step S10 (step S28).

If the instruction indicating the movement of the reproduction area is not inputted from the arrow buttons 26 ("NO" in step S28), only the instruction indicating the enlargement and display is inputted. Therefore, the CPU 110 outputs the magnification detected in step S27 to the stereoscopic image signal processing device 133. The stereoscopic image signal processing device 133 cuts out areas necessary for the enlargement and display from the right eye image and the left eye image in accordance with the magnification inputted from the CPU 110 and outputs the areas to the monitor 16 through the video encoder 134. As a result, the center of the entire image is enlarged and displayed on the monitor 16 with the instructed magnification (step S29).

If the instruction indicating the movement of the reproduction area is inputted from the arrow buttons 26 ("YES" in step S28), the instruction indicating the enlargement and display and the instruction indicating the movement of the reproduction area are inputted. Therefore, the CPU 110 detects the movement amount in the instruction indicating the movement inputted in step S10 and outputs the detected movement amount and the magnification detected in step S27 to the stereoscopic image signal processing device 133. The stereoscopic image signal processing device 133 calculates areas to be cut out for the enlargement and display from the right eye image and the left eye image used for the display of the entire image based on the inputted movement amount and magnification and acquires a distance between the center of the cut out area necessary for the enlargement and display of the right eye image and the center of the photographed right eye image and a distance between the center of the cut out area necessary for the enlargement and display of the left eye image and the center of the photographed left eye image (step S44). In the case illustrated in FIG. 20, the distance in the horizontal direction between the center of the area necessary for the enlargement and display of the right eye image and the center of the right eye image is 1800 pixels. In the case of FIG. 21, the distance in the horizontal direction between the center of the area necessary for the enlargement and display of the left eye image and the center of the left eye image is 1600 pixels. The stereoscopic image signal processing device 133 outputs the acquired result to the CPU 100.

The CPU 110 acquires the rotational deviation amounts θ1 and θ2 from the SDRAM 114. The CPU 110 then calculates, for each of the right eye image and the left eye image, a deviation amount in the vertical direction at the center of the area necessary for the enlargement and display from the result inputted from the stereoscopic image signal processing device 133 and the rotational deviation amounts θ1 and θ2 acquired from the SDRAM 114, based on Expression 2 (step S45).

(Deviation amount in vertical direction (left eye image))=(distance between center of photographed left eye image and center of area necessary for enlargement and display of left eye image)×(rotational deviation amount θ1 of left eye image)

(Deviation amount in vertical direction (right eye image))=(distance between center of photographed right eye image and center of area necessary for enlargement and display of right eye image)×(rotational deviation amount θ2 of right eye image)     [Expression 2]

Figure 20:
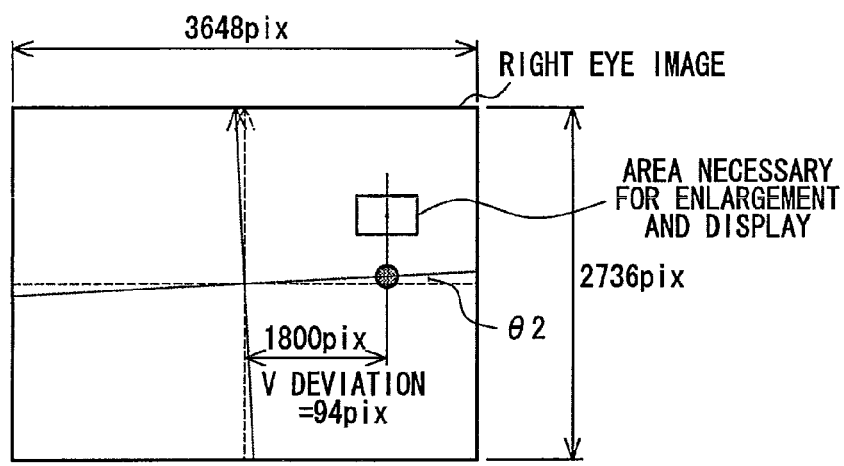
FIG. 20 is a diagram for explaining a method of calculating a deviation amount in a vertical direction of a right eye image of an area used for enlargement and display of a compound-eye digital camera.
Figure 21:
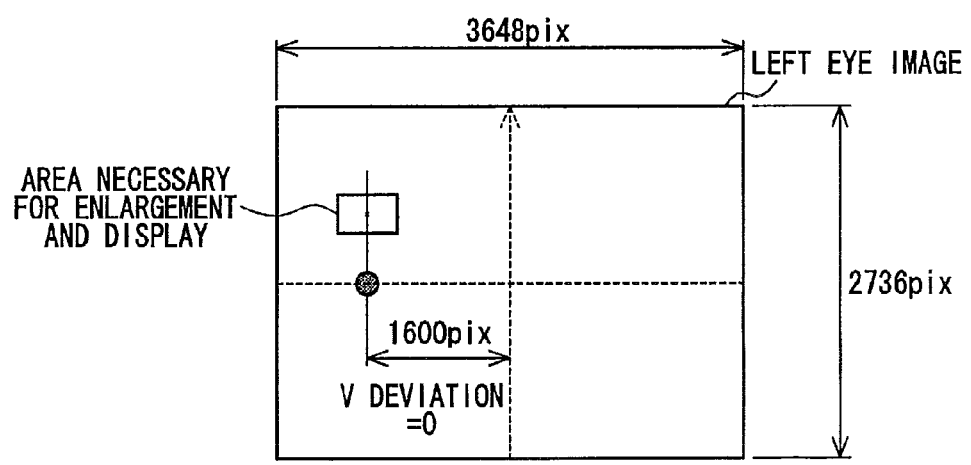
FIG. 21 is a diagram for explaining a method of calculating a deviation amount in a vertical direction of a left eye image of an area used for enlargement and display of the compound-eye digital camera.

In the case illustrated in FIG. 20, the distance in the horizontal direction between the center of the area necessary for the enlargement and display of the right eye image and the center of the photographed right eye image is 1800 pixels, and the rotational deviation amount acquired from the SDRAM 114 is θ2. Therefore, the CPU 110 calculates the deviation amount in the vertical direction as 1800 pixels×θ2 (3°)=94 pixels. In the case illustrated in FIG. 21, the distance in the horizontal direction between the center of the area necessary for the enlargement and display of the left eye image and the center of the photographed left eye image is 1600 pixels. Therefore, the CPU 110 calculates the deviation amount in the vertical direction as 1600 pixels×θ2 (0°)=0 pixel.

The CPU 110 multiplies the deviation amount of the right eye image and the left eye image acquired in step S45 by the magnification acquired in step S27 to correct the deviation amount. The CPU 110 then calculates a shift amount of the sub-image relative to the reference image (relative value of the deviation amount of the sub-image of the reference image) based on the corrected deviation amount using Expression 1 (step S46).

The CPU 110 inputs the shift amount calculated in step S46 to the stereoscopic image signal processing device 133. The stereoscopic image signal processing device 133 cuts outs the area to be cut out obtained in step S30 from the right eye image used for the reproduction of the entire image and moves the cut out right eye image in parallel in the vertical direction by the inputted shift amount (step S33).

The stereoscopic image signal processing device 133 cuts out the area to be cut out obtained in step S30 from the left eye image used for the reproduction of the entire image. An image for display is generated from the cut out left eye image (reference image) and the right eye image (sub-image) moved in the vertical direction in step S33, and the image is outputted to the monitor 16 (step S34). As a result, the enlarged image after the elimination of the parallax deviation is displayed on the monitor 16.

According to the present embodiment, the parallax deviation in the vertical direction can be eliminated when the parallax deviation in the vertical direction generated by rotational deviation between the right imaging system and the left imaging system causes a large impact such as when an edge section in the horizontal direction of an image is extracted, enlarged, and displayed. The measurement result during inspection is used to eliminate the parallax deviation. Therefore, there is no need to detect the feature points and the corresponding points every time the image is reproduced. Therefore, the enlarged image can be displayed in a short time.

According to the present embodiment, there is no need to measure deviation amounts in the vertical direction at a plurality of positions during the inspection as in the second embodiment, and just an angle of the rotational deviation may be obtained. More specifically, the deviation in the vertical direction is only at one location. Therefore, effort in the inspection can be saved, and the time required for the inspection can be reduced.

Although an enlarged and displayed image, in which the parallax deviation is eliminated, is reproduced in the first to third embodiments, the enlarged and displayed image, in which the parallax deviation is eliminated, may be saved. As a result, the deviation amount, etc. does not have to be calculated when the image is displayed. Therefore, an easily viewable image without parallax deviation can be quickly displayed. The advantage is the highest in the first embodiment including a large amount of calculations during reproduction of image. Since a correction is made to eliminate the parallax deviation, the image is easily viewable when reproduced in the other display devices.

The presently disclosed subject matter can be applied not only to the compound-eye digital camera with two imaging systems, but also to a compound-eye digital camera with three or more imaging systems. In the case of the compound-eye digital camera with three or more imaging systems, not all imaging systems need to be used to take an image, and at least two imaging systems need to be used. The imaging systems do not have to be arranged side by side, but may be arranged diagonally, etc.

The presently disclosed subject matter can be applied not only to the compound-eye digital camera, but also to various stereoscopic image display apparatuses, such as a viewer and a PC (personal computer), to which a right eye image and a left eye image are inputted and which include a monitor that can display a stereoscopic image. The presently disclosed subject matter can also be provided as a program applied to a compound-eye digital camera, a stereoscopic image display apparatus, etc. When a result during inspection is used as in the second and third embodiments, the result during inspection may be acquired along with images, such as by a method of storing the result during inspection in tabs, etc. of an image file of the right eye image and the left eye image.

The presently disclosed subject matter can be provided as a computer-readable program code for causing a device (such as an electronic camera, a compound-eye camera or a computer) to execute the above described process, a non-transitory computer-readable recording medium (for example, an optical disc such as a CD (Compact Disc), a DVD (Digital Versatile Disc) and a BD (Blu-ray Disc), a magnetic disc such as a hard disc, a magneto-optical disc) on which the computer-readable program code is stored or a computer program product including the computer-readable program code.

What is claimed is:

1. A stereoscopic image display apparatus comprising: a display device capable of displaying a stereoscopic image; an acquisition device configured to acquire a left eye image and a right eye image;
   a first display control device configured to display a stereoscopic image on the display device based on the left eye image and the right eye image;
   an instruction reception device configured to receive an instruction indicating enlargement and display of a partial area deviated in a horizontal direction from a center of the stereoscopic image displayed on the display device;
   a cut-out device configured to cut out areas necessary for the enlargement and display from the left eye image and the right eye image in response to the instruction received by the instruction reception device;
   a deviation amount calculation unit configured to calculate a parallax deviation amount in a vertical movement between a center of the left eye image, from which the area necessary for the enlargement and display is cut out by the cut-out device, and a center of the right eye image, from which the area necessary for the enlargement and display is cut out by the cut-out device, based on acquired information indicating deviation of the left eye image and information indicating deviation of the right eye image, wherein each of said center of the left eye image and the right eye image is different than said center of the stereoscopic image;
   an image movement device configured to move at least one of the left eye image and the right eye image, from which the areas necessary for the enlargement and display are cut out, in the vertical movement by the deviation amount calculated by the deviation amount calculation device; and
   a second display control device configured to enlarge and display the partial area, for which the instruction indicating the enlargement and display is received by the instruction reception device, on the display device based on the image after the movement by the image movement device.

2. The stereoscopic image display apparatus according to claim 1, further comprising
   a corresponding point extraction device configured to extract corresponding points from the left eye image and the right eye image, from which the areas necessary for the enlargement and display are cut out, wherein the deviation amount calculation device calculates a distance between the corresponding points extracted by the corresponding point extraction device as the deviation amount.

3. The stereoscopic image display apparatus according to claim 1, wherein the acquisition device acquires information indicating deviation of the left eye image and information indicating deviation of the right eye image along with the left eye image and the right eye image, and the deviation amount calculation device calculates the deviation amount in the vertical movement between the center of the left eye image, from which the area necessary for the enlargement and display is cut out by the cut-out device, and the center of the right eye image, from which the area necessary for the enlargement and display is cut out by the cut-out device, based on the acquired information indicating the deviation of the left eye image and the information indicating the deviation of the right eye image.

4. The stereoscopic image display apparatus according to claim 3, wherein the acquisition device acquires results of inspection, at a plurality of positions, of deviation amounts in the vertical movement between an actual imaging result of a predetermined subject and an ideal imaging result of the predetermined subject as the information indicating the deviation of the left eye image and the information indicating the deviation of the right eye image, and the deviation amount calculation device calculates the deviation amount based on the acquired results.

5. The stereoscopic image display apparatus according to claim 4, wherein the deviation amount calculation device calculates the deviation amount in the vertical movement between the center of the left eye image, from which the area necessary for the enlargement and display is cut out by the cut-out device, and the center of the right eye image, from which the area necessary for the enlargement and display is cut out by the cut-out device, based on the deviation amount in the vertical movement at a position closest to the center of the partial area, for which the instruction indicating the enlargement and display is received by the instruction reception device, among the results of the inspection at the plurality of positions of the deviation amount in the vertical movement between the actual imaging result of the predetermined subject and the ideal imaging result of the predetermined subject.

6. The stereoscopic image display apparatus according to claim 3, wherein the acquisition device acquires a rotational deviation amount between the actual imaging result of the predetermined subject and the ideal imaging result of the predetermined subject as the information indicating the deviation of the left eye image and the information indicating the deviation of the right eye image, and the deviation amount calculation device calculates the deviation amount in the vertical movement between the center of the left eye image, from which the area necessary for the enlargement and display is cut out by the cut-out device, and the center of the right eye image, from which the area necessary for the enlargement and display is cut out by the cut-out device, based on the acquired rotational deviation amount and the position in the horizontal direction of the partial area, for which the instruction indicating the enlargement and display is received by the instruction reception device.

7. The stereoscopic image display apparatus according to claim 1, wherein the image movement device moves the left eye image and the right eye image, from which the areas necessary for the enlargement and display are cut out, by n pixels each if the deviation amount calculated by the deviation amount calculation device is 2n (n is an integer) pixels, and the image movement device moves one of the left eye image and the right eye image, from which the areas necessary for the enlargement and display are cut out, by n+1 pixels and the other by n pixels if the deviation amount calculated by the deviation amount calculation device is 2n+1 pixels.

8. The stereoscopic image display apparatus according to claim 1, further comprising:

a storage device configured to store the image after the movement by the image movement device, wherein the second display control device uses the image stored in the storage device to enlarge and display the partial area, for which the instruction indicating the enlargement and display is received by the instruction reception device, on the display device.

9. A compound-eye imaging apparatus comprising:

the stereoscopic image display apparatus according to claim 1; and a plurality of imaging devices configured to take the right eye image and the left eye image.

10. A non-transitory computer-readable recording medium including a stereoscopic image display program stored thereon, such that when the stereoscopic image display program is read and executed by a processor, the processor is configured to perform:

a step of acquiring a left eye image and a right eye image;

a step of displaying a stereoscopic image on a display device capable of displaying the stereoscopic image based on the left eye image and the right eye image;

a step of receiving an instruction indicating enlargement and display of a partial area deviated in a horizontal direction from a center of the stereoscopic image displayed on the display device;

a step of cutting out areas necessary for the enlargement and display from the left eye image and the right eye image in response to the received instruction;

a step of calculating a parallax deviation amount in a vertical movement between a center of the left eye image, from which the area necessary for the enlargement and display is cut out, and a center of the right eye image, from which the area necessary for the enlargement and display is cut out, based on acquired information indicating deviation of the left eye image and information indicating deviation of the right eye image, wherein each of said center of the left eye image and the right eye image is different than said center of the stereoscopic image;

a step of moving at least one of the left eye image and the right eye image, from which the areas necessary for the enlargement and display are cut out, in parallel in the vertical movement by the calculated deviation amount; and a step of enlarging and displaying the partial area, for which the instruction indicating the enlargement and display is received, on the display device based on the image after the movement.

\* \* \* \* \*